(12) United States Patent
Sengupta et al.

(10) Patent No.: US 12,095,558 B2
(45) Date of Patent: Sep. 17, 2024

(54) TECHNIQUES FOR INTERLEAVING A TRANSPORT BLOCK

(71) Applicant: QUALCOMM Incorporated, San Diego, CA (US)

(72) Inventors: Ayan Sengupta, San Diego, CA (US); Alberto Rico Alvarino, San Diego, CA (US); Kazuki Takeda, Tokyo (JP); Le Liu, Fremont, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 416 days.

(21) Appl. No.: 17/221,520

(22) Filed: Apr. 2, 2021

(65) Prior Publication Data

US 2022/0321259 A1 Oct. 6, 2022

(51) Int. Cl.
*H04L 1/00* (2006.01)
*H04L 5/00* (2006.01)

(52) U.S. Cl.
CPC .......... *H04L 1/0069* (2013.01); *H04L 1/0058* (2013.01); *H04L 1/0071* (2013.01); *H04L 5/0082* (2013.01)

(58) Field of Classification Search
CPC ... H04L 1/0069; H04L 1/0058; H04L 1/0071; H04L 5/0082
See application file for complete search history.

(56) References Cited

U.S. PATENT DOCUMENTS

| | | | |
|---|---|---|---|
| 2017/0214495 A1* | 7/2017 | Golitschek Edler von Elbwart ... | H04W 72/21 |
| 2019/0132097 A1* | 5/2019 | Ma ........................ | H04L 1/1861 |
| 2019/0327027 A1* | 10/2019 | Webb ........................ | H04L 1/08 |
| 2021/0105804 A1* | 4/2021 | Bagheri ................ | H04L 5/0053 |
| 2021/0211232 A1* | 7/2021 | Hwang ................ | H04W 72/0446 |
| 2021/0219329 A1* | 7/2021 | Zhou ..................... | H04W 72/23 |
| 2021/0288745 A1* | 9/2021 | Einhaus ................ | H04L 5/0044 |
| 2022/0124761 A1* | 4/2022 | Muruganathan .. | H04W 72/1273 |
| 2022/0216944 A1* | 7/2022 | Muruganathan .. | H04W 72/0446 |

(Continued)

OTHER PUBLICATIONS

Partial International Search Report—PCT/US2022/018327—ISA/EPO—Jun. 13, 2022 (2102292WO).

(Continued)

*Primary Examiner* — Oussama Roudani
(74) *Attorney, Agent, or Firm* — Holland & Hart LLP

(57) ABSTRACT

Methods, systems, and devices for wireless communications are described. A base station may apply a scaling factor to a transport block of a first size, where the scaling factor may increase the transport block from the first size to a second size. The base station may interleave a set of parts of the transport block of the second size across a set of transmission time intervals (TTIs) in accordance with a transport block allocation pattern, where the set of TTIs may be contiguous or separated from each other by one or more intervening intervals. The base station may transmit, to a user equipment, an indication of the transport block allocation pattern applied to the transport block of the second size, and may transmit the set of parts of the transport block of the second size across the set of TTIs in accordance with the transport block allocation pattern.

26 Claims, 20 Drawing Sheets

(56) References Cited

U.S. PATENT DOCUMENTS

2022/0303988 A1*  9/2022  Yi .......................... H04L 1/1887
2023/0075748 A1*  3/2023  Yan ........................ H04L 1/1887

OTHER PUBLICATIONS

Qualcomm Incorporated: "Discussion on Broadcast/Multicast for RRC_Idle and RRC_Inactive UEs", 3GPP TSG RAN WG1 #104, 3GPP Draft, R1-2101489, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, 8 Pages, Jan. 19, 2021 (Jan. 19, 2021), XP051971654, Retrieved from the Internet: URL: https://ftp.3gpp.org/tsg_ran/WG1_RL1/TSGR1_104-e/Docs/R1-2101489.zip [retrieved on Jan. 19, 2021] Section 6 "GC-PDSCH configuration for Broadcast MCCH/MTCH", pp. 4-6, figures 1-3, Section 3 "Conclusion", pp. 7-8.

Qualcomm Incorporated: "Views on Reliability Enhancement for Multicast RRC_Connected UEs", 3GPP TSG RAN WG1 #103-e, 3GPP Draft, R1-2009275, 3rd Generation Partnership Project (3GPP), Mobile Competence Centre, 6501 Route Des Lucioles, F-06921 Sophia-Antipolis Cedex, France, vol. RAN WG11, No. e-Meeting, Oct. 26, 2020-Nov. 13, 2020, 7 Pages, Oct. 24, 2020 (Oct. 24, 2020), XP051946938, Retrieved from the Internet: URL: https://ftp.3gpp.org/tsg_ran/WG1_RL1/TSGR1_103-e/Docs/R1-2009275.zip [retrieved on Oct. 24, 2020], Section 2.2 "GC-PDSCH repetition", p. 4, figure 1.

International Search Report and Written Opinion—PCT/US2022/018327—ISA/EPO—Aug. 4, 2022 (2102292WO).

* cited by examiner

TECHNIQUES FOR INTERLEAVING A TRANSPORT BLOCK

FIELD OF TECHNOLOGY

The following relates to wireless communications, including techniques for interleaving a transport block.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications, a first communication device may experience interference (e.g., time-dependent interference) while receiving a transport block (e.g., a payload) from a second communication device. If the interference prevents the first communication device from successfully receiving the transport block from the second communication device, the first device may transmit hybrid automatic repeat request (HARQ) feedback to the second communication device. The HARQ feedback may include a request for the second communication device to retransmit the transport block. In some cases, however, the first communication device may be unable to transmit HARQ feedback for the transport block. As such, the second communication device may not retransmit the transport block and the first communication device may be unable to decode the transport block successfully. Methods may be improved to increase communication reliability.

SUMMARY

The described techniques relate to improved methods, systems, devices, and apparatuses that support techniques for interleaving a transport block. Generally, the described techniques provide for configuring a first communication device (e.g., a user equipment (UE)) to receive transport blocks from a second communication device (e.g., a base station). To improve reliability of communications between the first communication device and the second communication device in the absence of hybrid automatic repeat request (HARM) feedback, for example, the second communication device may transmit different parts of a message, such as a transport block, in different transmission time intervals (TTIs) such that the first communication device may receive the transport block with higher time diversity. The higher time diversity associated with transmitting the transport block in different TTIs may reduce adverse effects of interference on communications between the first communication device and the second communication device. In some examples, the second communication device may apply a scaling factor to a transport block and may interleave multiple parts of the transport block across multiple TTIs in accordance with a transport block allocation pattern. The second communication device may transmit an indication of the transport block allocation pattern to the first communication device. In accordance with the transport block allocation pattern, the second communication device may transmit the multiple parts of the transport block to the first communication device across the multiple TTIs. In some examples, the multiple TTIs may be separated by one or more intervening intervals. After receiving the multiple parts of the transport block, the first communication device may decode the transport block based on the multiple parts of the transport block.

A method for wireless communications at a user equipment (UE) is described. The method may include receiving, from a base station, an indication of a transport block allocation pattern to be applied by the UE to receipt of a transport block, receiving a set of multiple parts of the transport block across a set of multiple TTIs in accordance with the transport block allocation pattern, where the set of multiple TTIs are separated from each other by one or more intervening intervals, and decoding the transport block based on the set of multiple parts of the transport block.

An apparatus for wireless communications at a UE is described. The apparatus may include a processor, memory coupled with the processor, and instructions stored in the memory. The instructions may be executable by the processor to cause the apparatus to receive, from a base station, an indication of a transport block allocation pattern to be applied by the UE to receipt of a transport block, receive a set of multiple parts of the transport block across a set of multiple TTIs in accordance with the transport block allocation pattern, where the set of multiple TTIs are separated from each other by one or more intervening intervals, and decode the transport block based on the set of multiple parts of the transport block.

Another apparatus for wireless communications at a UE is described. The apparatus may include means for receiving, from a base station, an indication of a transport block allocation pattern to be applied by the UE to receipt of a transport block, means for receiving a set of multiple parts of the transport block across a set of multiple TTIs in accordance with the transport block allocation pattern, where the set of multiple TTIs are separated from each other by one or more intervening intervals, and means for decoding the transport block based on the set of multiple parts of the transport block.

A non-transitory computer-readable medium storing code for wireless communications at a UE is described. The code may include instructions executable by a processor to receive, from a base station, an indication of a transport block allocation pattern to be applied by the UE to receipt of a transport block, receive a set of multiple parts of the transport block across a set of multiple TTIs in accordance with the transport block allocation pattern, where the set of multiple TTIs are separated from each other by one or more intervening intervals, and decode the transport block based on the set of multiple parts of the transport block.

In some examples of the method, apparatuses, and non-transitory computer-readable medium described herein, receiving the indication of the transport block allocation pattern may include operations, features, means, or instructions for receiving a message indicating a number of TTIs in the one or more intervening intervals between each TTI of the set of multiple TTIs.

Some examples of the method, apparatuses, and non-transitory computer-readable medium described herein may further include operations, features, means, or instructions for receiving a first set of parts of the set of multiple parts in a first TTI and receiving a second set of parts of the set of multiple parts in a second TTI, the first TTI and the second TTI separated by the number of TTIs in accordance with the transport block allocation pattern.

In some examples of the method, apparatuses, and non-transitory computer-readable medium described herein, receiving the indication of the transport block allocation pattern may include operations, features, means, or instructions for receiving a message indicating one or more time domain resource allocation table entries and receiving an indication of a time domain resource allocation table entry of the one or more time domain resource allocation table entries, the transport block allocation pattern indicated by the time domain resource allocation table entry.

Some examples of the method, apparatuses, and non-transitory computer-readable medium described herein may further include operations, features, means, or instructions for receiving a message indicating the UE may be scheduled to receive a second transport block, where the transport block may be time-interleaved with the second transport block, the transport block allocation pattern to be applied by the UE to receipt of the transport block and the second transport block.

Some examples of the method, apparatuses, and non-transitory computer-readable medium described herein may further include operations, features, means, or instructions for receiving an indication of one or more parameters associated with the transport block, where decoding the transport block may be based on the one or more parameters.

In some examples of the method, apparatuses, and non-transitory computer-readable medium described herein, the one or more parameters indicate that each part of the set of multiple parts may be mapped to one redundancy version of a set of multiple redundancy versions.

In some examples of the method, apparatuses, and non-transitory computer-readable medium described herein, receiving the indication of the one or more parameters may include operations, features, means, or instructions for receiving a mapping of each redundancy version of the set of multiple redundancy versions to a circular buffer.

In some examples of the method, apparatuses, and non-transitory computer-readable medium described herein, the mapping indicates a starting position of a first redundancy version of the set of multiple redundancy versions and a starting position of each subsequent of each redundancy version based on an ending of a previous adjacent redundancy version.

In some examples of the method, apparatuses, and non-transitory computer-readable medium described herein, the mapping indicates a defined starting position of each redundancy version of the set of multiple redundancy versions, the set of multiple redundancy versions including five or more redundancy versions.

A method for wireless communications at a UE is described. The method may include receiving, from a base station, an indication of a transport block allocation pattern to be applied by the UE to receipt of a transport block, receiving an indication of a scaling factor applied to a number of bits of the transport block, receiving a set of multiple parts of the transport block across a set of multiple TTIs in accordance with the transport block allocation pattern and as scaled by the scaling factor, and decoding the transport block based on the set of multiple parts of the transport block and based on the scaling factor.

An apparatus for wireless communications at a UE is described. The apparatus may include a processor, memory coupled with the processor, and instructions stored in the memory. The instructions may be executable by the processor to cause the apparatus to receive, from a base station, an indication of a transport block allocation pattern to be applied by the UE to receipt of a transport block, receive an indication of a scaling factor applied to a number of bits of the transport block, receive a set of multiple parts of the transport block across a set of multiple TTIs in accordance with the transport block allocation pattern and as scaled by the scaling factor, and decode the transport block based on the set of multiple parts of the transport block and based on the scaling factor.

Another apparatus for wireless communications at a UE is described. The apparatus may include means for receiving, from a base station, an indication of a transport block allocation pattern to be applied by the UE to receipt of a transport block, means for receiving an indication of a scaling factor applied to a number of bits of the transport block, means for receiving a set of multiple parts of the transport block across a set of multiple TTIs in accordance with the transport block allocation pattern and as scaled by the scaling factor, and means for decoding the transport block based on the set of multiple parts of the transport block and based on the scaling factor.

A non-transitory computer-readable medium storing code for wireless communications at a UE is described. The code may include instructions executable by a processor to receive, from a base station, an indication of a transport block allocation pattern to be applied by the UE to receipt of a transport block, receive an indication of a scaling factor applied to a number of bits of the transport block, receive a set of multiple parts of the transport block across a set of multiple TTIs in accordance with the transport block allocation pattern and as scaled by the scaling factor, and decode the transport block based on the set of multiple parts of the transport block and based on the scaling factor.

Some examples of the method, apparatuses, and non-transitory computer-readable medium described herein may further include operations, features, means, or instructions for receiving a predefined threshold scaling factor corresponding to the number of bits of the transport block for performing limited buffer rate matching.

Some examples of the method, apparatuses, and non-transitory computer-readable medium described herein may further include operations, features, means, or instructions for determining a threshold transport block size for performing limited buffer rate matching, where the threshold transport block size may be based on a maximum supported modulation order of the UE, a predefined threshold modulation order independent of a configured modulation order for downlink reception, the predefined maximum scaling factor corresponding to the number of bits of the transport block, a predefined threshold code rate, or a combination thereof.

Some examples of the method, apparatuses, and non-transitory computer-readable medium described herein may further include operations, features, means, or instructions for identifying a coding rate associated with decoding the transport block in a TTI of the set of multiple TTIs and comparing the coding rate to a predefined maximum coding rate, where decoding the transport block in the TTI may be based on the coding rate being less than the predefined maximum coding rate.

Some examples of the method, apparatuses, and non-transitory computer-readable medium described herein may further include operations, features, means, or instructions for decoding the transport block in only a last TTI of the set of multiple TTIs based on the coding rate being greater than the predefined maximum coding rate.

In some examples of the method, apparatuses, and non-transitory computer-readable medium described herein, the predefined maximum coding rate may be greater than 0.95.

Some examples of the method, apparatuses, and non-transitory computer-readable medium described herein may further include operations, features, means, or instructions for receiving an indication that the scaling factor may be equal to a number of TTIs across which the set of multiple parts of the transport block may be received.

Some examples of the method, apparatuses, and non-transitory computer-readable medium described herein may further include operations, features, means, or instructions for receiving a message indicating one or more parameters associated with the transport block, where the one or more parameters may be associated with the transport block being scaled, the scaling factor being a parameter of the one or more parameters.

In some examples of the method, apparatuses, and non-transitory computer-readable medium described herein, the one or more parameters indicate that each part of the set of multiple parts may be mapped to one redundancy version of a set of multiple redundancy versions.

In some examples of the method, apparatuses, and non-transitory computer-readable medium described herein, receiving the indication of the one or more parameters may include operations, features, means, or instructions for receiving a mapping of each redundancy version of the set of multiple redundancy versions to a circular buffer.

In some examples of the method, apparatuses, and non-transitory computer-readable medium described herein, the mapping indicates a starting position of a first redundancy version of the set of multiple redundancy versions and a starting position of each subsequent of each redundancy version based on an ending of a previous adjacent redundancy version.

In some examples of the method, apparatuses, and non-transitory computer-readable medium described herein, the mapping indicates a defined starting position of each redundancy version of the set of multiple redundancy versions, the set of multiple redundancy versions including five or more redundancy versions.

In some examples of the method, apparatuses, and non-transitory computer-readable medium described herein, the set of multiple TTIs may be separated from each other by one or more intervening intervals.

In some examples of the method, apparatuses, and non-transitory computer-readable medium described herein, the transport block corresponds to a multicast or broadcast transmission.

In some examples of the method, apparatuses, and non-transitory computer-readable medium described herein, the transport block allocation pattern indicates that the multicast or broadcast transmission may be interleaved with a unicast transmission.

Some examples of the method, apparatuses, and non-transitory computer-readable medium described herein may further include operations, features, means, or instructions for receiving a downlink control information message indicating scheduling information for a set of multiple transport blocks, where the set of multiple transport blocks may be interleaved.

In some examples of the method, apparatuses, and non-transitory computer-readable medium described herein, the set of multiple TTIs include a contiguous time allocation.

In some examples of the method, apparatuses, and non-transitory computer-readable medium described herein, receiving the indication of the transport block allocation pattern may include operations, features, means, or instructions for receiving a downlink control information message including the indication.

In some examples of the method, apparatuses, and non-transitory computer-readable medium described herein, each TTI of the set of multiple TTIs may be a slot.

A method for wireless communications at a UE is described. The method may include receiving, from a base station, an indication of a transport block allocation pattern to be applied by the UE to receipt of a transport block, receiving a set of multiple parts of the transport block across a set of multiple TTIs in accordance with the transport block allocation pattern, calculating an overall throughput in each TTI of the set of multiple TTIs, where the overall throughput is associated with a set of multiple received transmissions, the set of multiple received transmissions including the set of multiple parts of the transport block, comparing the overall throughput in each TTI to a threshold throughput associated with a capability of the UE, where the transport block contributes to the overall throughput only during a last TTI of the set of multiple TTIs, and decoding the set of multiple received transmissions based on the overall throughput in each TTI being less than the threshold throughput.

An apparatus for wireless communications at a UE is described. The apparatus may include a processor, memory coupled with the processor, and instructions stored in the memory. The instructions may be executable by the processor to cause the apparatus to receive, from a base station, an indication of a transport block allocation pattern to be applied by the UE to receipt of a transport block, receive a set of multiple parts of the transport block across a set of multiple TTIs in accordance with the transport block allocation pattern, calculate an overall throughput in each TTI of the set of multiple TTIs, where the overall throughput is associated with a set of multiple received transmissions, the set of multiple received transmissions including the set of multiple parts of the transport block, compare the overall throughput in each TTI to a threshold throughput associated with a capability of the UE, where the transport block contributes to the overall throughput only during a last TTI of the set of multiple TTIs, and decode the set of multiple received transmissions based on the overall throughput in each TTI being less than the threshold throughput.

Another apparatus for wireless communications at a UE is described. The apparatus may include means for receiving, from a base station, an indication of a transport block allocation pattern to be applied by the UE to receipt of a transport block, means for receiving a set of multiple parts of the transport block across a set of multiple TTIs in accordance with the transport block allocation pattern, means for calculating an overall throughput in each TTI of the set of multiple TTIs, where the overall throughput is associated with a set of multiple received transmissions, the set of multiple received transmissions including the set of multiple parts of the transport block, means for comparing the overall throughput in each TTI to a threshold throughput associated with a capability of the UE, where the transport block contributes to the overall throughput only during a last TTI of the set of multiple TTIs, and means for decoding the set of multiple received transmissions based on the overall throughput in each TTI being less than the threshold throughput.

A non-transitory computer-readable medium storing code for wireless communications at a UE is described. The code may include instructions executable by a processor to receive, from a base station, an indication of a transport block allocation pattern to be applied by the UE to receipt of a transport block, receive a set of multiple parts of the transport block across a set of multiple TTIs in accordance with the transport block allocation pattern, calculate an overall throughput in each TTI of the set of multiple TTIs, where the overall throughput is associated with a set of multiple received transmissions, the set of multiple received transmissions including the set of multiple parts of the transport block, compare the overall throughput in each TTI to a threshold throughput associated with a capability of the UE, where the transport block contributes to the overall throughput only during a last TTI of the set of multiple TTIs, and decode the set of multiple received transmissions based on the overall throughput in each TTI being less than the threshold throughput.

A method for wireless communications at a base station is described. The method may include applying a scaling factor to a transport block of a first size, the scaling factor increasing the transport block from the first size to a second size, interleaving a set of multiple parts of the transport block of the second size across a set of multiple TTIs in accordance with a transport block allocation pattern, where the set of multiple TTIs are separated from each other by one or more intervening intervals, transmitting, to a UE, an indication of the transport block allocation pattern applied to the transport block of the second size, and transmitting the set of multiple parts of the transport block of the second size across the set of multiple TTIs in accordance with the transport block allocation pattern.

An apparatus for wireless communications at a base station is described. The apparatus may include a processor, memory coupled with the processor, and instructions stored in the memory. The instructions may be executable by the processor to cause the apparatus to apply a scaling factor to a transport block of a first size, the scaling factor increasing the transport block from the first size to a second size, interleave a set of multiple parts of the transport block of the second size across a set of multiple TTIs in accordance with a transport block allocation pattern, where the set of multiple TTIs are separated from each other by one or more intervening intervals, transmit, to a UE, an indication of the transport block allocation pattern applied to the transport block of the second size, and transmit the set of multiple parts of the transport block of the second size across the set of multiple TTIs in accordance with the transport block allocation pattern.

Another apparatus for wireless communications at a base station is described. The apparatus may include means for applying a scaling factor to a transport block of a first size, the scaling factor increasing the transport block from the first size to a second size, means for interleaving a set of multiple parts of the transport block of the second size across a set of multiple TTIs in accordance with a transport block allocation pattern, where the set of multiple TTIs are separated from each other by one or more intervening intervals, means for transmitting, to a UE, an indication of the transport block allocation pattern applied to the transport block of the second size, and means for transmitting the set of multiple parts of the transport block of the second size across the set of multiple TTIs in accordance with the transport block allocation pattern.

A non-transitory computer-readable medium storing code for wireless communications at a base station is described. The code may include instructions executable by a processor to apply a scaling factor to a transport block of a first size, the scaling factor increasing the transport block from the first size to a second size, interleave a set of multiple parts of the transport block of the second size across a set of multiple TTIs in accordance with a transport block allocation pattern, where the set of multiple TTIs are separated from each other by one or more intervening intervals, transmit, to a UE, an indication of the transport block allocation pattern applied to the transport block of the second size, and transmit the set of multiple parts of the transport block of the second size across the set of multiple TTIs in accordance with the transport block allocation pattern.

In some examples of the method, apparatuses, and non-transitory computer-readable medium described herein, transmitting the indication of the transport block allocation pattern may include operations, features, means, or instructions for transmitting a message indicating a number of TTIs in the one or more intervening intervals between each TTI of the set of multiple TTIs.

Some examples of the method, apparatuses, and non-transitory computer-readable medium described herein may further include operations, features, means, or instructions for transmitting a first set of parts of the set of multiple parts in a first TTI and transmitting a second set of parts of the set of multiple parts in a second TTI, the first TTI and the second TTI separated by the number of TTIs in accordance with the transport block allocation pattern.

In some examples of the method, apparatuses, and non-transitory computer-readable medium described herein, transmitting the indication of the transport block allocation pattern may include operations, features, means, or instructions for transmitting a message indicating one or more time domain resource allocation table entries and transmitting an indication of a time domain resource allocation table entry of the one or more time domain resource allocation table entries, the transport block allocation pattern indicated by the time domain resource allocation table entry.

Some examples of the method, apparatuses, and non-transitory computer-readable medium described herein may further include operations, features, means, or instructions for transmitting a message indicating the UE may be scheduled to receive a second transport block, where the transport block of the second size may be time-interleaved with the second transport block in accordance with the transport block allocation pattern.

Some examples of the method, apparatuses, and non-transitory computer-readable medium described herein may further include operations, features, means, or instructions for transmitting an indication of one or more parameters associated with the transport block.

In some examples of the method, apparatuses, and non-transitory computer-readable medium described herein, the one or more parameters indicate that each part of the set of multiple parts may be mapped to one redundancy version of a set of multiple redundancy versions.

In some examples of the method, apparatuses, and non-transitory computer-readable medium described herein, transmitting the indication of the one or more parameters may include operations, features, means, or instructions for transmitting a mapping of each redundancy version of the set of multiple redundancy versions to a circular buffer.

In some examples of the method, apparatuses, and non-transitory computer-readable medium described herein, the mapping indicates a starting position of a first redundancy version of the set of multiple redundancy versions and a starting position of each subsequent of each redundancy version based on an ending of a previous adjacent redundancy version.

In some examples of the method, apparatuses, and non-transitory computer-readable medium described herein, the mapping indicates a defined starting position of each redundancy version of the set of multiple redundancy versions, the set of multiple redundancy versions including five or more redundancy versions.

A method for wireless communications at a base station is described. The method may include applying a scaling factor to a number of bits of a transport block of a first size, the scaling factor increasing the transport block from the first size to a second size, interleaving a set of multiple parts of the transport block of the second size across a set of multiple TTIs in accordance with a transport block allocation pattern, transmitting, to a UE, an indication of the transport block allocation pattern applied to the transport block of the second size, transmitting an indication of the scaling factor applied to the number of bits of the transport block of the first size, and transmitting the set of multiple parts of the transport block of the second size across the set of multiple TTIs in accordance with the transport block allocation pattern and as scaled by the scaling factor.

An apparatus for wireless communications at a base station is described. The apparatus may include a processor, memory coupled with the processor, and instructions stored in the memory. The instructions may be executable by the processor to cause the apparatus to apply a scaling factor to a number of bits of a transport block of a first size, the scaling factor increasing the transport block from the first size to a second size, interleave a set of multiple parts of the transport block of the second size across a set of multiple TTIs in accordance with a transport block allocation pattern, transmit, to a UE, an indication of the transport block allocation pattern applied to the transport block of the second size, transmit an indication of the scaling factor applied to the number of bits of the transport block of the first size, and transmit the set of multiple parts of the transport block of the second size across the set of multiple TTIs in accordance with the transport block allocation pattern and as scaled by the scaling factor.

Another apparatus for wireless communications at a base station is described. The apparatus may include means for applying a scaling factor to a number of bits of a transport block of a first size, the scaling factor increasing the transport block from the first size to a second size, means for interleaving a set of multiple parts of the transport block of the second size across a set of multiple TTIs in accordance with a transport block allocation pattern, means for transmitting, to a UE, an indication of the transport block allocation pattern applied to the transport block of the second size, means for transmitting an indication of the scaling factor applied to the number of bits of the transport block of the first size, and means for transmitting the set of multiple parts of the transport block of the second size across the set of multiple TTIs in accordance with the transport block allocation pattern and as scaled by the scaling factor.

A non-transitory computer-readable medium storing code for wireless communications at a base station is described. The code may include instructions executable by a processor to apply a scaling factor to a number of bits of a transport block of a first size, the scaling factor increasing the transport block from the first size to a second size, interleave a set of multiple parts of the transport block of the second size across a set of multiple TTIs in accordance with a transport block allocation pattern, transmit, to a UE, an indication of the transport block allocation pattern applied to the transport block of the second size, transmit an indication of the scaling factor applied to the number of bits of the transport block of the first size, and transmit the set of multiple parts of the transport block of the second size across the set of multiple TTIs in accordance with the transport block allocation pattern and as scaled by the scaling factor.

Some examples of the method, apparatuses, and non-transitory computer-readable medium described herein may further include operations, features, means, or instructions for transmitting a predefined maximum scaling factor for performing limited buffer rate matching, where the scaling factor may be less than or equal to the predefined maximum scaling factor, and where the predefined maximum scaling factor corresponds to the number of bits of the transport block.

Some examples of the method, apparatuses, and non-transitory computer-readable medium described herein may further include operations, features, means, or instructions for transmitting a predefined maximum transport block size for performing limited buffer rate matching, where the predefined maximum transport block size may be based on a maximum modulation order of the UE, the predefined maximum scaling factor corresponding to the number of bits of the transport block, a predefined maximum code rate, or a combination thereof.

Some examples of the method, apparatuses, and non-transitory computer-readable medium described herein may further include operations, features, means, or instructions for transmitting an indication that the scaling factor may be equal to a number of TTIs across which the set of multiple parts of the transport block may be transmitted.

Some examples of the method, apparatuses, and non-transitory computer-readable medium described herein may further include operations, features, means, or instructions for transmitting a message indicating one or more parameters associated with the transport block, where the one or more parameters may be associated with the transport block being scaled, the scaling factor being a parameter of the one or more parameters.

In some examples of the method, apparatuses, and non-transitory computer-readable medium described herein, the one or more parameters indicate that each part of the set of multiple parts may be mapped to one redundancy version of a set of multiple redundancy versions.

In some examples of the method, apparatuses, and non-transitory computer-readable medium described herein, transmitting the indication of the one or more parameters may include operations, features, means, or instructions for transmitting a mapping of each redundancy version of the set of multiple redundancy versions to a circular buffer.

In some examples of the method, apparatuses, and non-transitory computer-readable medium described herein, the mapping indicates a starting position of a first redundancy version of the set of multiple redundancy versions and a starting position of each subsequent of each redundancy version based on an ending of a previous adjacent redundancy version.

In some examples of the method, apparatuses, and non-transitory computer-readable medium described herein, the mapping indicates a defined starting position of each redundancy version of the set of multiple redundancy versions, the set of multiple redundancy versions including five or more redundancy versions.

In some examples of the method, apparatuses, and non-transitory computer-readable medium described herein, the set of multiple TTIs may be separated from each other by one or more intervening intervals.

In some examples of the method, apparatuses, and non-transitory computer-readable medium described herein, the transport block allocation pattern indicates that the transport block may be a multicast or broadcast transmission.

In some examples of the method, apparatuses, and non-transitory computer-readable medium described herein, the transport block allocation pattern indicates that the multicast or broadcast transmission may be interleaved with a unicast transmission.

Some examples of the method, apparatuses, and non-transitory computer-readable medium described herein may further include operations, features, means, or instructions for transmitting a downlink control information message indicating scheduling information for a set of multiple transport blocks, where the set of multiple transport blocks may be interleaved.

In some examples of the method, apparatuses, and non-transitory computer-readable medium described herein, transmitting the indication of the transport block allocation pattern may include operations, features, means, or instructions for transmitting a downlink control information message including the indication.

In some examples of the method, apparatuses, and non-transitory computer-readable medium described herein, each TTI of the set of multiple TTIs may be a slot.

DETAILED DESCRIPTION

Figure 1:
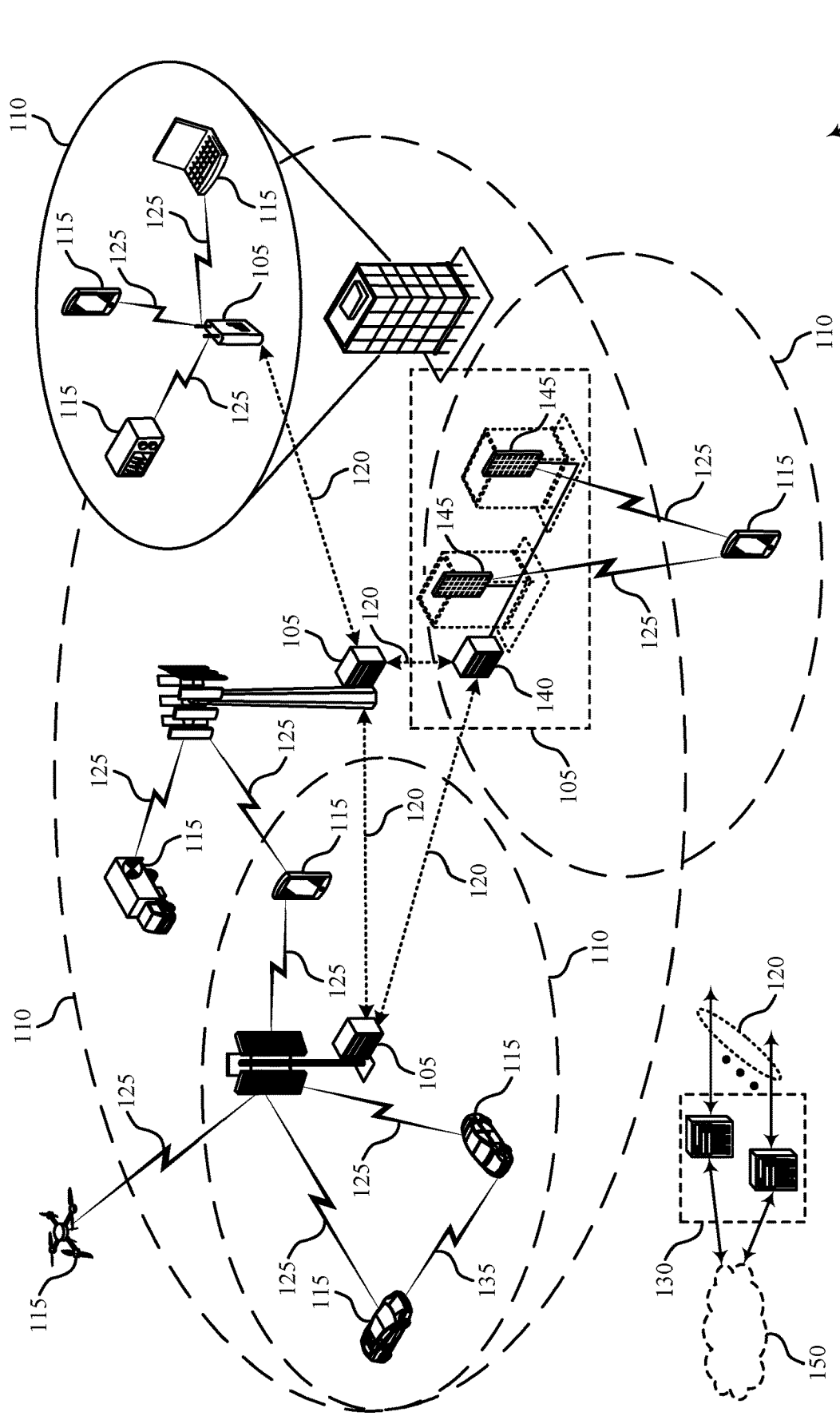
FIG. 1 illustrates an example of a wireless communications system that supports techniques for interleaving a transport block in accordance with aspects of the present disclosure.

A wireless communications system may include various communication devices, such as a user equipment (UE) and a base station, which may provide wireless communication services to the UE. For example, a base station may be a next-generation NodeB (which may be referred to as a gNB) that may support multiple radio access technologies including fourth generation (4G) systems, such as 4G Long Term Evolution (LTE), as well as fifth generation (5G) systems (which may be referred to as 5G new radio (NR)). In some cases, a base station may communicate with one or more UEs in a geographic coverage area of the base station. For example, the base station may transmit one or more messages, such as a transport block, to a UE in the geographic coverage area of the base station. Accordingly, the UE may receive and decode the transport block. In some cases, however, the UE may experience interference that may prevent the UE from successfully receiving and decoding the transport block. To mitigate such interference, the base station may configure the UE to transmit hybrid automatic repeat request (HARQ) feedback to the base station. The HARQ feedback may include a request for the base station to retransmit the transport block.

In some cases, however, the transport block may be part of a multicast or broadcast communication. For example, the base station may transmit the transport block over a broadcast channel (e.g., a physical broadcast channel (PBCH)) to any UEs monitoring the broadcast channel. As a result, the base station may be unaware of which UEs are attempting to receive and decode the transport block. That is, a UE attempting to receive and decode the transport block may not be configured to transmit HARQ feedback if the UE is unable to successfully receive and decode the transport block. Thus, if the UE experiences interference that prevents the UE from successfully receiving the transport block, the UE may be unable to request a retransmission of the transport block from the base station and may therefore receive the transport block with reduced reliability.

To improve communication reliability, various aspects of the present disclosure relate to a base station transmitting a transport block to a UE (e.g., as part of multicast or broadcast communication) over multiple (e.g., non-contiguous or contiguous) transmission time intervals (TTIs) to increase time-diversity of the transmission. For example, the base station may transmit different parts of the transport block in different TTIs (e.g., slots) such that if the UE experiences interference while attempting to receive a part of the transport block in a specific TTI, the UE may still be able to receive other parts of the transport block in other TTIs. If the UE successfully receives other parts of the transport block, the UE may be able to decode the transport block without the part that was impacted by interference. As such, the UE may receive the transport block from the base station with increased reliability.

The base station may transmit such a transport block by scaling the transport block (e.g., using a scaling factor) to a larger size than the original transport block. The base station may map parts of the scaled transport block to multiple (e.g., non-contiguous or contiguous) TTIs (e.g., slots, mini-slots, symbols), and may transmit each part in a different TTI. To facilitate transmission of the transport block, the base station may transmit an indication of a transport block allocation pattern (e.g., a transport block-TTI mapping pattern) to the UE. The indication of the transport block allocation pattern may include a transport block-TTI mapping pattern, a TTI spacing for the transport block-TTI mapping pattern, a time domain resource allocation (TDRA) index corresponding to the transport block allocation pattern, or both. Additionally or alternatively, the base station may transmit a message to the UE indicating a mapping between the parts of the scaled transport block and one or more redundancy versions (RVs) associated with a circular buffer configuration.

Aspects of the present disclosure may be implemented to realize one or more of the following potential advantages or improvements, among others. The present disclosure may provide benefits and enhancements to the operation of a UE. For example, the present disclosure may provide improvements to downlink reception at a UE. By configuring the UE to receive transport blocks from a base station, the UE may receive communications from the base station with increased reliability. More specifically, the transport blocks may be associated with higher time-diversity. Such time-diversity may allow the UE to mitigate time-dependent interference during downlink reception. As a result, the UE and the base station may communicate with increased spectral efficiency and higher reliability.

Aspects of the disclosure are initially described in the context of wireless communications systems. Aspects are then described with reference to an interleaving process, circular buffers, and a process flow. Aspects of the disclosure are further illustrated by and described with reference to apparatus diagrams, system diagrams, and flowcharts that relate to techniques for interleaving a transport block.

FIG. 1 illustrates an example of a wireless communications system 100 that supports techniques for interleaving a transport block in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta f_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may experience interference while attempting to receive a message (e.g., a transport block) from a base station 105. A transport block may refer to data passed down from an upper layer (e.g., from a MAC layer) down to a lower layer (e.g., to a physical layer (PHY)) for transmission. If the interference prevents the UE 115 from successfully receiving the transport block from the base station 105, the UE 115 may transmit HARQ feedback to the base station 105. The HARQ feedback may include a request for the base station 105 to retransmit the transport block. In some cases, however, the UE 115 may be unable to transmit HARQ feedback for the transport block. For example, if the transport block is part of a multicast or broadcast transmission, the base station 105 may not configure the UE 115 to transmit HARQ feedback for the transport block (e.g., to avoid channel congestion). As such, the base station 105 may not retransmit the transport block and the UE 115 may be unable to properly decode the transport block.

To improve the reliability of communications between the UE 115 and the base station 105, the base station 105 may transmit different parts of the transport block in different TTIs such that a UE may receive the transport block with a higher time-diversity. Accordingly, the higher time-diversity associated with transmitting the transport block in different TTIs may reduce adverse effects of interference on such communications between the base station 105 and the UE 115. The base station 105 may configure the UE 115 to receive the transport block over different (e.g., non-contiguous or contiguous) TTIs based on transmitting an indication of a transport block allocation pattern to the UE 115. The indication may include a transport block-TTI mapping pattern, a scaling factor, a modified redundancy version (RV) definition, a TDRA index, or a combination thereof as described herein.

Figure 2:
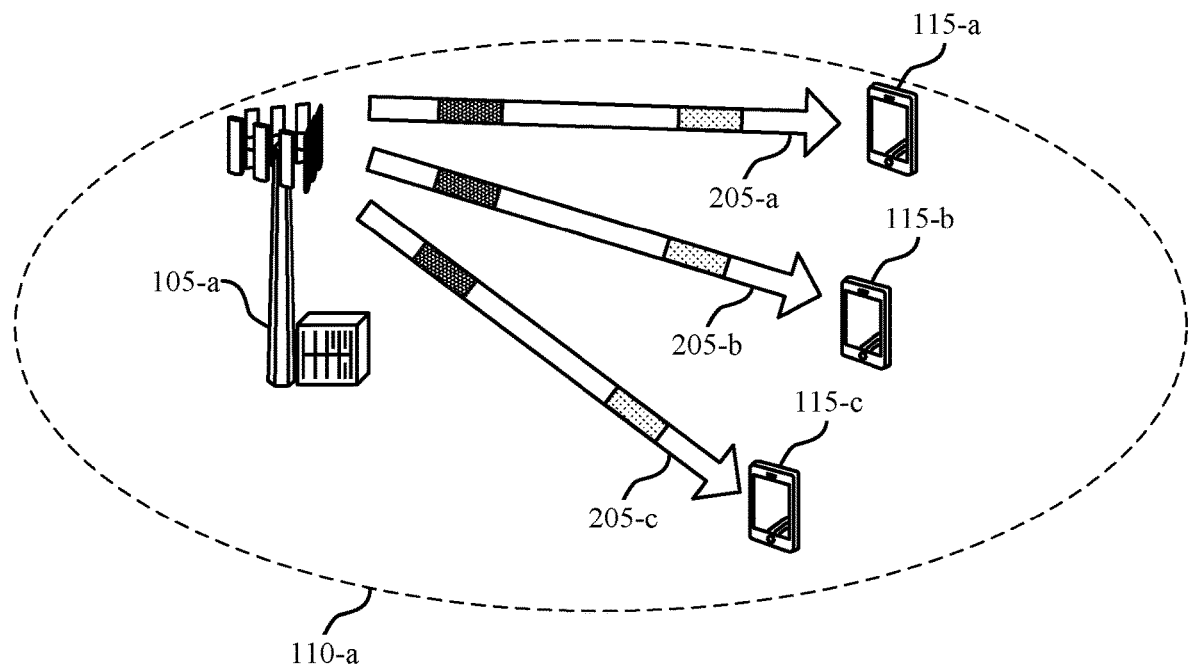
FIG. 2 illustrates an example of a wireless communications system that supports techniques for interleaving a transport block in accordance with aspects of the present disclosure.

FIG. 2 illustrates an example of a wireless communications system 200 that supports techniques for interleaving a transport block in accordance with aspects of the present disclosure. The wireless communications system 200 may implement aspects of the wireless communications system 100 or may be implemented by aspects of the wireless communications system 100 as described herein with reference to FIG. 1. The wireless communications system 200 may include base station 105-a, UE 115-a, UE 115-b, and UE 115-c, which may be examples of a base station 105 and UEs 115 as described herein with reference to FIG. 1. Base station 105-a may serve geographic coverage area 110-a, and may communicate with UEs 115-a, 115-b, and 115-c in geographic coverage area 110-a, which may be an example of a geographic coverage area 110 as described with reference to FIG. 1. In the wireless communications system 200, base station 105-a may transmit a transport block allocation pattern 210 to UEs 115-a, 115-b, and 115-c over communication links 205-a, 205-b, and 205-c, respectively. The wireless communications system 200 may support improved spectral efficiency and enhanced reliability for wireless communications between base station 105-a and UEs 115-a, 115-b, and 115-c based on using the transport block allocation pattern 210 to transmit a transport block 220 over multiple contiguous or non-contiguous TTIs.

In some wireless communications systems, a base station 105 (e.g., base station 105-a) may transmit a transport block (e.g., transport block 220) to a UE 115 (e.g., UE 115-a) during a TTI. If the UE 115 experiences interference (e.g., time-dependent fading) during the TTI, the UE 115 may be unable to properly decode the transport block. In some cases (e.g., for unicast transmissions), the base station 105 may configure the UE 115 to transmit HARQ feedback using physical uplink control channel (PUCCH) resources if the UE 115 is unable to decode the transport block. Accordingly, the base station 105 may retransmit the transport block in a later TTI based on receiving HARQ feedback from the UE 115. As such, the UE 115 may be able to decode the retransmitted transport block in the later TTI.

In some cases, however, the base station 105 may not configure the UE 115, or the UE 115 may otherwise be unable to transmit HARQ feedback for unsuccessfully received transport blocks. For example, if the transport block is part of a broadcast or multicast transmission intended for multiple recipient UEs 115 (e.g., UEs 115-a, 115-b, and 115-c), configuring each recipient UE 115 to transmit HARQ feedback for the transport block may result in prohibitive PUCCH resource allocation and channel congestion. In such cases, the base station 105 may time-interleave the transport block to improve reliability of the broadcast or multicast transmission because opportunities for feedback-based retransmissions (e.g., retransmissions based on HARQ feedback) may be limited (or non-existent) for broadcast or multicast applications (e.g., watching television).

In accordance with aspects of the present disclosure, the wireless communications system 200 may support improved reliability and spectral efficiency for transmissions based on using a transport block allocation pattern (e.g., a transport block-TTI mapping pattern) to transmit different parts of transport block 220 in different TTIs (e.g., slots). More specifically, base station 105-a may apply a scaling factor to transport block 220 to increase the size of transport block 220. Base station 105-a may interleave multiple parts (e.g., RVs) of transport block 220 across multiple contiguous or non-contiguous TTIs according to transport block allocation pattern 210, and transmit the parts of transport block 220 in the multiple contiguous or non-contiguous TTIs. Base station 105-a may also transmit an indication of the transport block allocation pattern to one or more recipient UEs 115 (e.g., UE 115-a, UE 115-b, UE 115-c, or a combination thereof) such that the recipient UEs 115 may receive, aggregate, and decode the parts of transport block 220 according to the transport block allocation pattern.

To transmit transport block 220 using the transport block allocation pattern, base station 105-a may identify transport block 220 for transmission to the one or more recipient UEs 115. Base station 105-a may apply a scaling factor to transport block 220. That is, base station 105-a may increase the size (e.g., number of bits) of transport block 220 (e.g., a transport block size (TBS) of transport block 220) by the scaling factor. After scaling transport block 220, base station 105-a may interleave parts of transport block 220 across multiple non-contiguous TTIs according to transport block allocation pattern 210. Alternatively, the base station 105 a may transmit parts of transport block across multiple contiguous (e.g., adjacent) TTIs. In some examples, if multi-transport block scheduling is employed, base station 105-a may apply transport block allocation pattern 210 across multiple transport blocks. For example, base station 105-a may interleave parts of transport block 220 with parts of a second transport block such that both transport block 220 and the second transport block experience higher time-diversity. Base station 105-a may employ multi-transport block scheduling by using a single downlink control information (DCI) message, in some cases, to schedule multiple interleaved transport blocks. In some examples, transport block allocation pattern 210 may be used for multicast operations, unicast operations, or both. For example, if the transport block allocation pattern employed by base station 105-a is supported for both multicast and unicast operations, unicast transmissions may be interleaved with multicast transmissions. That is, base station 105-a may interleave parts of a unicast transport block with parts of a multicast transport block such that both the unicast transport block and the multicast transport block experience greater time-diversity.

Base station 105-a may map parts of transport block 220 to a circular buffer, as described with reference to FIGS. 4A and 4B. More specifically, base station 105-a may map each part of transport block 220 to a different RV of the circular buffer. In some examples, base station 105-a may map the parts of transport block 220 to corresponding RVs of the circular buffer using a configured RV definition (e.g., modified RV definition), as described with reference to FIGS. 4A and 4B. After mapping the parts of transport block 220 to corresponding RVs of the circular buffer, base station 105-a may transmit a report including an indication of the scaled TBS of transport block 220, the configured RV definition, transport block allocation pattern 210, or a combination thereof to the one or more recipient UEs 115 before transmitting the mapped parts of transport block 220 across multiple contiguous or non-contiguous TTIs in accordance with the transport block allocation pattern (e.g., a transport block-TTI mapping pattern). As an example, base station 105-a may transmit the report in an RRC message, a DCI message, or a MAC-control element (CE) to UEs 115-a, 115-b, and 115-c prior to transmitting the mapped parts of transport block 220. In some examples, the configured RV definition may be jointly encoded with transport block allocation pattern 210 (e.g., in DCI fields associated with an interleaving mode configuration).

The one or more recipient UEs 115 may receive and aggregate the parts of transport block 220 based on the configured RV definition, the scaled TBS of transport block 220, transport block allocation pattern 210, or a combination thereof indicated by base station 105-a. After aggregating the parts of transport block 220 according to the transport block allocation pattern employed by base station 105-a, the one or more recipient UEs 115 may decode transport block 220. In some examples, the one or more recipient UEs 115 may skip decoding transport block 220 in all slots except the last slot of the slot-aggregation, such as when decoding a scaled transport block. As such, supported peak throughput for a transmission may be calculated based on the last slot of the aggregation, as opposed to calculating support peak throughput based on a duration of the transmission (e.g., the first slot of the transmission to the last slot of the transmission). That is, supported peak throughput for slots other than the last slot of the aggregation may not include throughput associated with transmission.

In some examples, the transport block allocation pattern employed by base station 105-a may support unicast retransmissions. If the transport block allocation pattern includes unicast HARQ feedback, base station 105-a may retransmit a transmission via a unicast transmission based on the unicast HARQ feedback. For example, if UE 115-b is unable to receive one or more parts of transport block 220 (e.g., via multicast), UE 115-b may transmit unicast HARQ feedback to base station 105-a requesting a retransmission of the one or more parts. Accordingly, base station 105-a may retransmit (e.g., via unicast) the one or more parts to UE 115-b. In some examples, transmissions may also be supported for dynamic and semi-persistent scheduling (SPS) physical downlink shared channel (PDSCH) communications between base station 105-a and the one or more recipient UEs 115. For example, base station 105-a may employ the transport block allocation pattern described herein to transmit an SPS PDSCH transmission to one or more of UEs 115-a, 115-b, and 115-c.

In some examples, the transport block allocation pattern employed by base station 105-a may be a PHY layer time-interleaving pattern that improves reliability via time-diversity harnessing in scenarios with a limited scope of HARQ feedback. That is, the transport block allocation pattern may employ a non-contiguous slot-aggregation framework that may harness benefits from time-interleaving. Alternatively, the transport block allocation pattern may employ a contiguous structure in which parts of transport block 220 are transmitted across adjacent TTIs. Using the transport block allocation pattern may provide significant time-diversity gains and improved reliability without sacrificing throughput. As a result, the transport block allocation pattern employed by base station 105-a may support throughput levels similar to non-interleaved transmissions. The transport block allocation pattern may be applied to multiple modes of operation (e.g., multicast, broadcast, etc.) and multiple device types (e.g., read-only memory (ROM) devices, devices in an idle mode, etc.) that are associated with limited HARQ feedback. However, it is to be understood that the transport block allocation pattern described herein may also be used in scenarios with HARQ feedback. That is, even in the presence of HARQ feedback, a slot-aggregated initial transmission may minimize retransmission load on the network (e.g., base station 105-a) and on common PUCCH resources, if configured.

Figure 3:
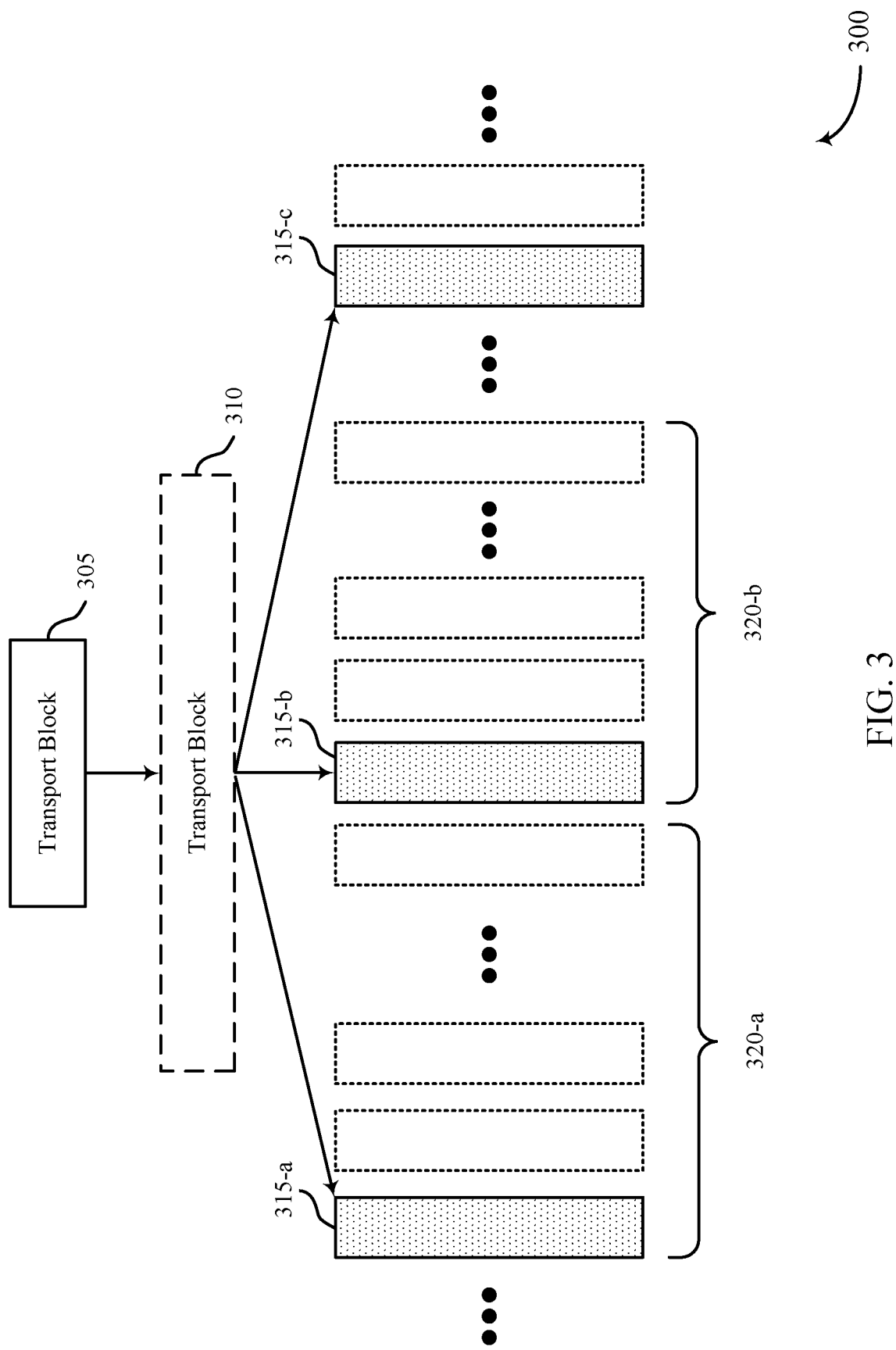
FIG. 3 illustrates an example of an interleaving process that supports techniques for interleaving a transport block in accordance with aspects of the present disclosure.

FIG. 3 illustrates an example of an interleaving process 300 that supports techniques for interleaving a transport block in accordance with aspects of the present disclosure. Interleaving process 300 may implement aspects of the wireless communications systems 100 and 200 or may be implemented by aspects of wireless communications systems 100 and 200 as described herein with reference to FIGS. 1 and 2, respectively. For example, interleaving process 300 may implement or be implemented by a base station 105 and one or more UEs 115, which may be examples of a base station 105 and a UE 115 as described herein with reference to FIGS. 1 and 2. In accordance with interleaving process 300, the base station 105 may use a scaling factor to generate a transport block 310 from a transport block 305. The base station 105 may map parts of transport block 310 to TTIs 315-a, 315-b, and 315-c, which may be separated by intervening intervals 320-a and 320-b. Interleaving process 300 may support transmission of a transport block 310 with higher time-diversity, improved spectral efficiency, and enhanced reliability, among other benefits.

In some cases, the base station 105 may transmit an unscaled transport block to one or more UEs 115 according to a set of limited-buffer rate matching (LBRM) rules. The set of LBRM rules may define a procedure for the base station 105 to lossily compress (e.g., truncate) a number of bits (e.g., a codeblock) from the unscaled transport block before transmitting the unsealed transport block to the one or more UEs 115. In some cases, the one or more UEs 115 may operate with a configured modulation order (e.g., 64-quadrature amplitude modulation (QAM)) that is associated with a maximum supported TBS. That is, the one or more UEs 115 may be unable to receive and decode transport blocks with TBSs larger than the maximum supported TBS associated with the configured modulation order. For example, if the one or more UEs 115 are configured with 64-QAM, the one or more UEs 115 may be unable to receive (e.g., on a PDSCH) a transport block with a TBS larger than a maximum TBS for 64-QAM. In some examples, the set of LBRM rules may be based on this maximum TBS. For example, the base station 105 may transmit the unsealed transport block to the one or more UEs 115 according to the set of LBRM rules such that a TBS of the unsealed transport block does not exceed the maximum TBS associated with the set of LBRM rules, based on the configured modulation order, or both of the one or more UEs 115. For example, a UE 115 (e.g., of the one or more UEs 115) may compare the coded bits corresponding to an initial TB S of a transport block to the coded bits corresponding to a threshold TBS for LBRM and may determine a number of bits in a codeblock of the transport block, given by $N_{cb}$, according to the expression $N_{cb}$=min (N, $N_{ref}$), where N is the number of coded bits in a codeblock corresponding to the initial TB S of the transport block, and $N_{ref}$ is the number of coded bits in a codeblock corresponding to the threshold TBS. The UE 115 may determine $N_{cb}$ such that $N_{cb}$ does not exceed $N_{ref}$. In some examples, if the initial TBS of the transport block results in a number of coded bits per codeblock N that exceeds the value $N_{ref}$ (corresponding to the number of coded bits per codeblock based on the threshold TBS), the UE 115 may employ the set of LBRM rules to truncate coded bits from the transport block such that $N_{cb}$ does not exceed $N_{ref}$. As a result, the configured modulation order of the one or more UEs 115 or the set of LBRM rules may prevent the one or more UEs 115 from attaining higher throughput levels (e.g., by receiving transport blocks with larger TBSs). In addition, the set of LBRM rules may be unable to account for TBS scaling.

In some examples, the UE 115 may count the unsealed transport block in a throughput budget of the UE 115 for a given slot. More specifically, the UE 115 may determine whether or not to decode the unsealed transport block based on Equation 1.

$$\sum_{j=0}^{J-1} \frac{\sum_{m=0}^{M-1} V_{j,m}}{T_{slot}^{\mu(j)}} \le DataRate \quad (1)$$

Equation 1 describes when a UE within a cell group may refrain from handing or decoding a PDSCH(s) transmission in a slot $s_j$ in a serving cell-j within a range (e.g., j=0, 1, 2 ... J−1, slot $s_j$ overlapping with any given point in time) if the condition shown in Equation 1 is not satisfied at a point in time, the UE 115 may not be expected to decode the one or more PDSCH transmissions. In the example of Equation 1, J may refer to a number of configured serving cells belonging to a frequency range. For the j-th serving cell, M may refer to a number of transport blocks transmitted in a slot $s_j$ and $T_{slot}^{\mu(j)}$ may be equivalent to a first expression $$\left(e.g., \frac{10^{-3}}{2^{\mu(j)}}\right),$$

where μ(j) may be a numerology for PDSCH(s) in slot $s_j$ of the j-th serving cell. For the m-th transport block, $V_{j,m}$ may be equivalent to a second expression $$\left(e.g., C' \times \left|\frac{A}{C}\right|\right),$$

where A is a number of bits in the transport block and C' is a number of scheduled code blocks for the transport block. The term DataRate (in Megabits per second (Mbps)) may be computed as a maximum data rate summed over all carriers in a frequency range for any signaled band combination and feature set consistent with the configured serving cells, where a value for DataRate may include a scaling factor f(i).

The UE 115 may calculate an overall throughput, shown as $\sum_{m=0}^{M-1} V_{j,m}$ in Equation 1, for each transmission (e.g., slot). The overall throughput may represent a throughput level that the UE 115 may be expected to decode. If the overall throughput is greater than the capability of the UE 115 (e.g., the term DataRate in Equation 1), the UE 115 may not be expected to decode such a PDSCH. In some cases, the outer summation term of Equation 1 may consider transmissions from different component carriers, different services (e.g., ultra-reliable low latency communications (URLLCs), enhanced mobile broadband (eMBB)), or both within a TTI.

In some cases, one or both of the maximum TBS or the LBRM rules for the UE 115 may depend on a maximum coding rate (e.g., 948/1024) supported by the UE 115. As a result, the maximum coding rate supported by the UE 115 may prevent the UE 115 from attaining higher throughput levels (e.g., by using a higher coding rate in a slot, including coding rates greater than 1).

In accordance with aspects of the present disclosure, the base station 105 may scale a TBS of transport block 305 by a scaling factor (e.g., n) to generate transport block 310. As such, a TBS of transport block 310 may be equivalent to a product of the scaling factor and the TBS of transport block 305. In some examples, however, transport block 310 may be unscaled. That is, the base station 105 may not apply a scaling factor to transport block 310. In some examples, the base station 105 and the one or more UEs 115 may be configured to support a TBS for interleaved transport blocks, where the configured TBS for interleaved transmission supports throughput levels similar to non-interleaved transmissions. For example, the configured TBS for interleaved transmission across multiple TTIs may support throughput levels similar to non-interleaved transmissions in which a transport block spans fewer TTIs (e.g., one slot). To accommodate such throughput levels, the one or more UEs 115 may be configured to support an increased TBS for transport block 305. The maximum supportable TBS may correspond to a maximum TBS scaling factor specified by a set of LBRM parameters and may depend on capabilities of the one or more UEs 115. That is, the one or more UEs 115 may be configured with a predefined maximum scaling factor for performing LBRM, which may be based on capabilities of the one or more UEs 115. In some examples, the TBS threshold for LBRM (e.g., $TBS_{LBRM}$) of transport block 305 may correspond to any modulation order of the one or more UEs 115 (e.g., 1024-QAM). For example, the TBS threshold for LBRM may corresponds to the maximum modulation order that the one or more UEs 115 may be capable of receiving rather than the configured modulation order for downlink reception at the one or more UEs 115. As a result, the one or more UEs 115 may be configured to losslessly support scaled TBSs appropriately, thereby supporting higher throughput levels (e.g., based on using larger TBSs) before LBRM rules lossily compress the transmitted bits.

In some examples, the set of LBRM rules may be modified to support usage of a larger TBS for transmissions. More specifically, some parameters, rules, equations, or a combination thereof associated with the set of LBRM rules used to transmit the unscaled transport block may be different from the set of LBRM rules used to transmit transport block 310. That is, the base station 105 may use a set of LBRM rules specific to time-interleaved (or other, more generally forms of TB-to-TTI mapping patterns, including contiguous TTI mapping patterns) transmissions when transmitting transport block 310. In some examples, the base station 105 may use a higher coding rate per slot (e.g., greater than 1) to transmit transport block 310 compared to transmitting an unscaled transport block.

With respect to Equation 1, the one or more UEs 115 may support time-interleaved transmissions (or transmissions with more general forms of TB-TTI mapping patterns, including contiguous TTI mapping patterns) with larger TBSs by modifying the determination of the overall throughput term (e.g., $\Sigma_{m=0}^{M-1} V_{j,m}$) such that a throughput level associated with a transmission (e.g., $V_{j,m}$) may not be included (e.g., counted) in the determination of the overall throughput for the initial TTIs associated with the transmission of the TB. Instead, the throughput level associated with the transmission may only be counted in a last TTI of the transmission. For example, the throughput level associated with the transmission may be represented by the equation $V_m^T = V_m^R \times 1_{lastTTI}$ This is motivated by the observation that, in several examples, due to high (e.g., >1) coding rates per slot/TTI, the one or more UEs may only be able to successfully decode the multi-TTI transmission after receiving all the TTIs up to and including the last TTI. Counting the throughput level in the initial slots provides no "early decoding" benefit for this multi-TTI transmission, while it may artificially reduce the simultaneous decoding capability of PDSCH(s) in those initial slots/TTIs associated with the multi-TTI transport transmission.

In some examples, the base station 105 may indicate to the one or more UEs 115 an increased TBS by indicating the scaling factor and a currently supported TBS of the one or more UEs 115. For example, the base station 105 may indicate an increased TBS (e.g., 100,000 bits) by indicating a scaling factor (e.g., n=4) and a currently supported TBS of the one or more UEs 115 (e.g., 25,000 bits). Accordingly, the one or more UEs 115 may determine the increased TBS based on the scaling factor and the currently supported TBS indicated by the base station 105. In some examples, the scaling factor may be specific to a multi-TT scaled transmission mode used by the base station 105.

The base station 105 may transmit parts of transport block 310 over a number of contiguous or non-contiguous TTIs (e.g., slots). That is, parts of transport block 310 may be transmitted across TTIs 315-a, 315-b, and 315-c. In some examples, the number of TTIs 315 over which the base station 105 transmits transport block 310 may be equivalent to the scaling factor. Although transport block 310 is shown as being transmitted over 3 TTIs 315, it is to be understood that any number of transport blocks 310 (e.g., m) may be transmitted over any number of TTIs 315. TTIs 315-a, 315-b, and 315-c may be separated by intervening intervals 320-a and 320-b. Intervening intervals 320-a and 320-b may include one or more TTIs 315 over which the base station 105 may refrain from transmitting parts of transport block 310. In some examples, intervening intervals 320-a and 320-b may have an equivalent duration. For example, intervening interval 320-a between TTIs 315-a and 315-b and intervening interval 320-b between TTIs 315-b and 315-c may include the same number of TTIs. In such examples, the base station 105 may signal intervening intervals 320-a and 320-b to the one or more UEs 115 as a skip value applied to slots in accordance with a transport block allocation pattern (e.g., transport block-TTI mapping pattern), as described with reference to FIG. 2. The skip value may indicate a transport block allocation pattern over the slots in the transport block allocation pattern. That is, the skip value may indicate that intervening intervals 320-a and 320-b have equivalent durations. For example, if the base station 105 indicates a skip value of 4, the one or more UEs 115 may determine that intervening intervals 320-a and 320-b both have a duration of 4 slots. Accordingly, the base station 105 may interleave parts of transport block 310 in non-contiguous TTIs 315 that are separated by intervening intervals 320-a and 320-b. More specifically, the base station 105 may transmit a first part of transport block 310 in TTI 315-a and a second part of transport block 310 in TTI 315-b such that TTI 315-a and TTI 315-b are separated by 4 slots. In some other examples, intervening interval 320-a may include a number of TTIs that is different from a number of TTIs included in intervening interval 320-b. Alternatively, the base station 105 may transmit parts of transport block 310 without intervening intervals 320. That is, the base station 105 may use a contiguous slot aggregation to transmit parts of transport block 310.

So that the one or more recipient UEs 115 of the interleaved transport block may efficiently decode the transport block, the one or more UEs 115 may receive a message from the base station 105 indicating one or more parameters related to interleaving process 300. The one or more parameters may include a scaling factor, a TBS of transport block 310, a transport block allocation pattern including multiple TTIs 315, a duration of an intervening interval 320 between the multiple TTIs 315, or a combination thereof. The base station 105 may indicate the one or more parameters to the one or more UEs 115 via a DCI message, a MAC CE, or an RRC message. For example, the base station 105 may indicate the one or more parameters to the one or more UEs 115 aperiodically during RRC configuration. Additionally or alternatively, the base station 105 may dynamically or semi-persistently indicate the one or more parameters to the one or more UEs 115 via a DCI message or a MAC-CE, respectively.

In some examples, the base station 105 may indicate the one or more parameters to the one or more UEs 115 using TDRA tables. TDRA tables may include one or more TDRA configurations (e.g., entries), where each TDRA configuration includes one or more fields, corresponding field types, or optional parameters corresponding to time-domain resources. For example, a TDRA configuration may include a starting symbol field, an ending symbol field, a duration field, or a timing advance field, among other related fields. Each TDRA configuration in the TDRA tables may have a specific value for each field and may be associated with a specific index of the TDRA tables. The base station 105 may configure the one or more UEs 115 with such TDRA tables during RRC configuration. In some cases, the base station 105 may configured one or more TDRA tables for a transport block 310 that may be scaled, or may be mapped to multiple TTIs (e.g., slots) according to a TB-TTI mapping pattern (including non-contiguous patterns), and one or more TDRA tables for an unscaled transport block. For example, the base station 105 may configure the one or more UEs 115 with a TDRA table (e.g., a new TDRA table) via an RRC message that may include information for mapping transport block 310 to TTIs 315-a, 315-b, and 315-c. In some examples, the base station 105 may indicate this mapping information as entries (e.g., candidates) within the TDRA table. After the one or more UEs 115 have been configured with the TDRA table, the base station may use a DCI message to signal a specific entry (e.g., pattern) from a set of configured entries in the TDRA table.

In some other examples, the base station 105 may append the mapping information to an existing TDRA table used by the one or more UEs 115. That is, the base station 105 may augment an existing TDRA table (e.g., during RRC configuration) with additional entries (e.g., candidates) that include information for mapping transport block 310 to TTIs 315-a, 315-b, and 315-c. Such additional entries may include one or more fields (e.g., new fields) and corresponding values, such as a time-interleaving field, a TBS scaling field, or a slot-aggregation field, among other fields. In some examples, the additional entries may be specific to a mode of transmission (e.g., a time-interleaved mode, a slot aggregated mode) that the base station 105 is using to communicate with the one or more UEs 115. After appending the mapping information to the existing TDRA table, the base station may use a DCI message to select an entry (e.g., a candidate pattern) from a set of entries in the augmented TDRA table.

After receiving the message from the base station 105 indicating one or more parameters related to interleaving process 300, the base station 105 may use a transport block-TTI mapping pattern to transmit different parts of scaled transport block 310 across the TTIs 315, as described with reference to FIG. 2. More specifically, the base station 105 may use a transport block allocation pattern, a modified RV definition, and a scaled TBS to transmit transport block 310 to the one or more UEs 115. In some examples, the transport block allocation pattern, the modified RV definition, the scaled TBS, or a combination thereof may be associated with a contiguous time allocation or a non-contiguous time allocation for transmission of transport block 310. Accordingly, the one or more UEs 115 may receive one or more parts of the transport block 310, and may aggregate the received parts. The one or more UEs 115 may decode transport block 310 based on the aggregated parts. In some examples, the one or more UEs 115 may be unable to decode each part of transport block 310 separately. Thus, aggregating the different parts may enable the one or more UEs 115 to successfully decode transport block 310.

In some examples, if the base station 105 transmits transport block 310 with an effective coding rate that is higher than a threshold (e.g., higher than 1), the one or more UEs 115 may be configured with a modified peak data rate equation such that the effective coding rate used to transmit transport block 310 does not exceed a maximum coding rate threshold for decodability of the one or more UEs 115. That is, the one or more UEs 115 may be configured to support larger coding rates in a slot. As a result, the one or more UEs 115 may attain higher throughput levels as compared to unscaled multi-TTI transmission of a transport block, based on using higher effective coding rates (e.g., per TTI, per slot).

Figure 4A:
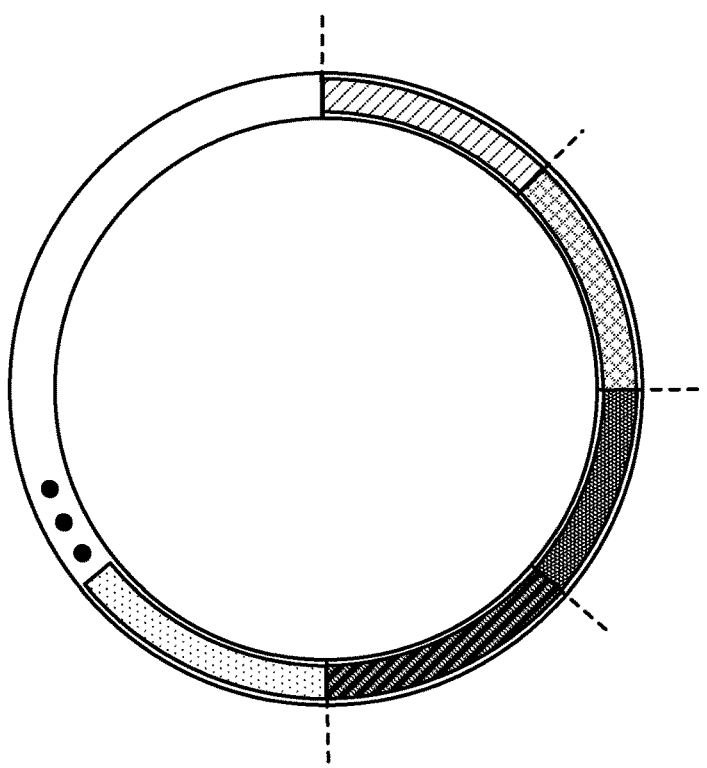
FIGS. 4A and 4B illustrate examples of circular buffers that support techniques for interleaving a transport block in accordance with aspects of the present disclosure.
Figure 4A:
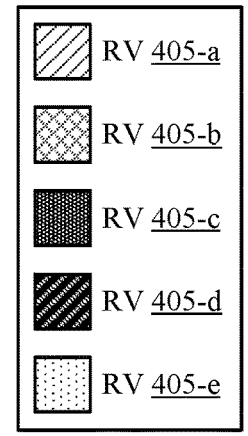
Figure 4B:
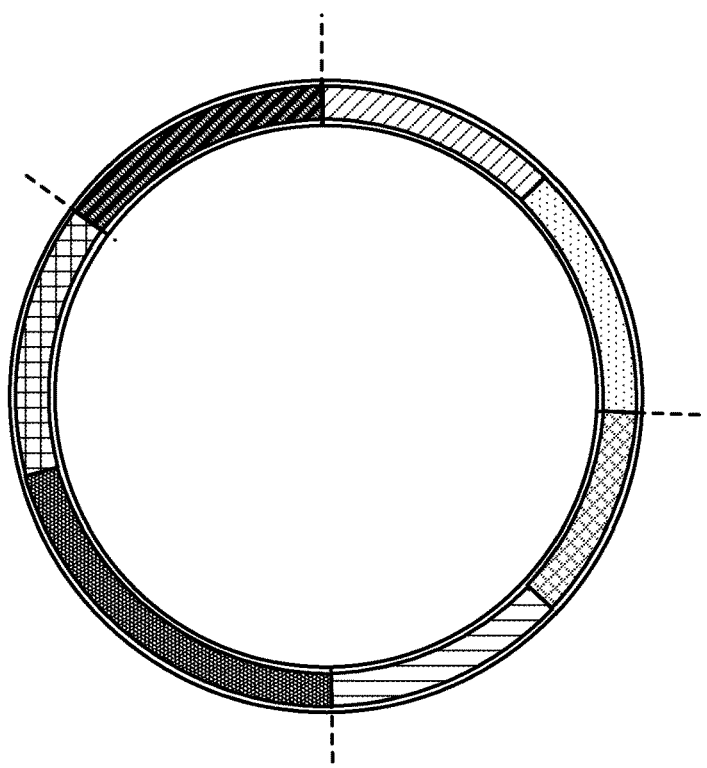
Figure 4B:
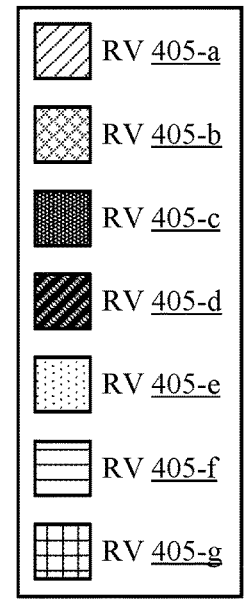

FIGS. 4A and 4B illustrate examples of circular buffers 400 and 401, respectively, that support techniques for interleaving a transport block in accordance with aspects of the present disclosure. Circular buffers 400 and 401 may implement aspects of wireless communications systems 100 and 200 or may be implemented by aspects of wireless communications systems 100 and 200 as described herein with reference to FIGS. 1 and 2, respectively. For example, circular buffers 400 and 401 may be implemented by a base station 105 or a UE 115, which may be examples of a base station 105 and a UE 115 as described with reference to FIGS. 1 through 3. Circular buffers 400 and 401 may include multiple RVs 405, which may be configured to support a transmission as described with reference to FIG. 2. Circular buffers 400 and 401 may support improved reliability and increased efficiency for transmissions based on reducing a number of punctured systematic bits in a transport block.

In some wireless communications systems, a base station 105 may use a circular buffer to map coded bits of a data transmission. The coded bits of the data transmission may include both systematic bits (e.g., information bits) and parity bits. Systematic bits may correspond to data (e.g., information) from the data transmission, whereas parity bits may be used for performing forward error correction (FEC) techniques on the data transmission (e.g., once the data transmission has been received). In some cases, the base station 105 may be unable to transmit all of the coded bits in a single TTI. To address this issue, the base station 105 may transmit different sections of the coded bits during different TTIs. These different sections may be referred to as RVs. Each RV in the circular buffer may be associated with a different combination of systematic bits and parity bits. The base station 105 may determine which RV to transmit in a given TTI based on a number of factors, such as a modulation and coding scheme (MCS) of the base station 105. For example, if the base station 105 is using a lower-order MCS (e.g., a quadrature phase shift keying (QPSK) scheme) for the data transmission, the base station 105 may transmit an RV with a relatively large number of parity bits (e.g., for error correction) and a relatively small number of systematic bits. In some cases, this may be problematic when high (e.g., >1) per-slot coding rates are used for a transport block transmission spanning multiple TTIs/slots.

In some cases, a configuration of the circular buffer may result in punctured systematic bits. For example, the circular buffer may be configured with a limited number of RV configurations such that some systematic bits mapped to the circular buffer are not transmitted in any of the RVs supported by the circular buffer. Punctured systematic bits may result in unreliable and inefficient data transmissions. For example, if the base station 105 transmits a data transmission to a UE 115 and some systematic bits from the data transmission are punctured during the transmission process, the UE 115 may not receive the punctured systematic bits and thus may not receive the information carried by the punctured systematic bits.

In accordance with aspects of the present disclosure, the base station 105 may increase reliability and efficiency for transmissions based on RV configurations defined by circular buffers 400 and 401. In some examples, the base station 105 may use circular buffers 400 and 401 to transmit a transmission (e.g., a scaled transmission, a slot-aggregated transmission, a time-interleaved transmission) to one or more recipient UEs 115, as described herein with reference to FIG. 2. For example, the base station 105 may map one or more parts of a transport block (e.g., transport block 310 as described herein with reference to FIG. 3) to one or both of circular buffers 400 and 401. Circular buffer 400 may include at least RV 405-a, RV 405-b, RV 405-c, RV 405-d, and RV 405-e, but it is to be understood that circular buffer 400 may include any number of RVs 405. Circular buffer 400 may be configured such that a starting pointer of each RV 405 is based on a previous adjacent RV 405 ending, such that a subsequent RV 405 may directly follow the end of a previous RV 405. For example, the start of RV 405-b may directly follow the end of the RV 405-a. Likewise, the start of RV 405-c may directly follow the end of RV 405-b, the start of RV 405-d may directly follow the end of RV 405-c, and the start of RV 405-e may directly follow the end of RV 405-d. As a result, systematic bits that are mapped to circular buffer 400 between RVs 405-a through 405-e may not be punctured during the transmission process. Thus, using circular buffer 400 may reduce the number of punctured systematic bits in the data transmission.

In some implementations, a circular buffer, such as circular buffer 401, may define starting points for each RV 405 included in the circular buffer. For example, circular buffer 401 may include RVs 405-*a*, 405-*b*, 405-*c*, 405-*d*, 405-*e*, 405-*f*, or 405-*g*, or a combination thereof. Each RV 405 may be associated with a configured starting point in circular buffer 401. In some cases, each RV 405 may be associated with a set of RVs 405. For example, RVs 405-*a* (e.g., $RV_0$), 405-*b* (e.g., $RV_1$), 405-*c* (e.g., $RV_2$), and 405-*d* (e.g., $RV_3$) may be associated with a first set of RVs 405 and RVs 405-*e* (e.g., $RV_5$), 405-*f* (e.g., $RV_6$), and 405-*g* (e.g., $RV_7$) may be associated with a second set of RVs 405 (e.g., an expanded set). The second set of RVs 405 may include any number of RVs, such as $RV_5$ through $RV_{16}$ or $RV_5$ through $RV_{32}$, among other examples. In some implementations, circular buffer 401 may use the first set of RVs 405 such as in low coding rate scenarios. In some implementations, circular buffer 401 may use the first set of RVs 405, the second set of RVs 405, or both in high coding rate scenarios. In some cases, the RV pattern used in circular buffer 401 may be based on a number of aggregated slots used for transmission of the RVs 405, where an RV pattern may refer to a number of RVs 405 that are included in the RV pattern, one or more sets of RVs 405 that are included in the RV pattern, a transmission order of RVs 405 included in the RV pattern, or a starting point of each RV 405 included in the RV pattern, among other parameters. In some examples, the number of RVs 405 included in circular buffer 401, the starting point for each RV 405 included in circular buffer 401, or both may be based on a number of aggregated slots for transmission of the included RVs 405. For example, as the number of aggregated slots increases, the number of RVs 405 included in circular buffer 401 may increase and thus the starting point for each RV 405 may change. For example, if the base station 105 scales the transport block by a factor of 3, the base station 105 may use an RV index pattern with 3 different RVs (e.g., RV 405-*a*, RV 405-*e*, and RV 405-*c*) such that the transport block is transmitted across 3 aggregated slots. Accordingly, the base station 105 (or some other network device) may configure the RV pattern of circular buffer 401 dynamically. In some examples, the base station 105 may dynamically indicate different RV index patterns to the one or more recipient UEs 115 via a MAC CE or a DCI message. In some other examples, the base station 105 may configure the one or more recipient UEs with an RV index pattern via an RRC message (e.g., during RRC configuration).

In some implementations, circular buffer 401 may initially include RVs 405 of the first set of RVs 405. One or more RVs 405 from the second set of circular buffers may then be added to circular buffer 401 to configure circular buffer 401 for a transmission. For example, the base station 105 may configure RV 405-*a* at 90 degrees of circular buffer 401, configure RV 405-*b* at zero degrees of circular buffer 104, configure RV-*c* at 270 degrees of circular buffer 401, and configure RV 405-*d* at 135 degrees of circular buffer 401. The base station 105 may then add RVs 405-*e*, 405-*f*, and 405-*g* to circular buffer 401 based on configurations of RVs 405-*a*, 405-*b*, 405-*c*, and 405-*d*. In one example, of an RV pattern for circular buffer 401, RV 405-*a* may be followed by RV 405-*e*, which may be followed by RV 405-*b*, which may be followed by RV 405-*f*, which may be followed by RV 405-*c*, which may be followed by RV 405-*g*, which may be followed by RV 405-*d*. Although illustrated with a specific RV pattern, it is to be understood that circular buffer 401 may be configured with any number of RV patterns involving any number of RVs 405.

Defining starting indices for RVs in circular buffers 400 and 401, as described herein, may allow the base station 105 to use circular buffers 400 and 401 with greater reliability and improved efficiency. That is, employing modified RV definitions may allow circular buffers 400 and 401 to support a larger number of RV configurations, which may in turn reduce a number of punctured systematic bits in circular buffers 400 and 401.

Figure 5:
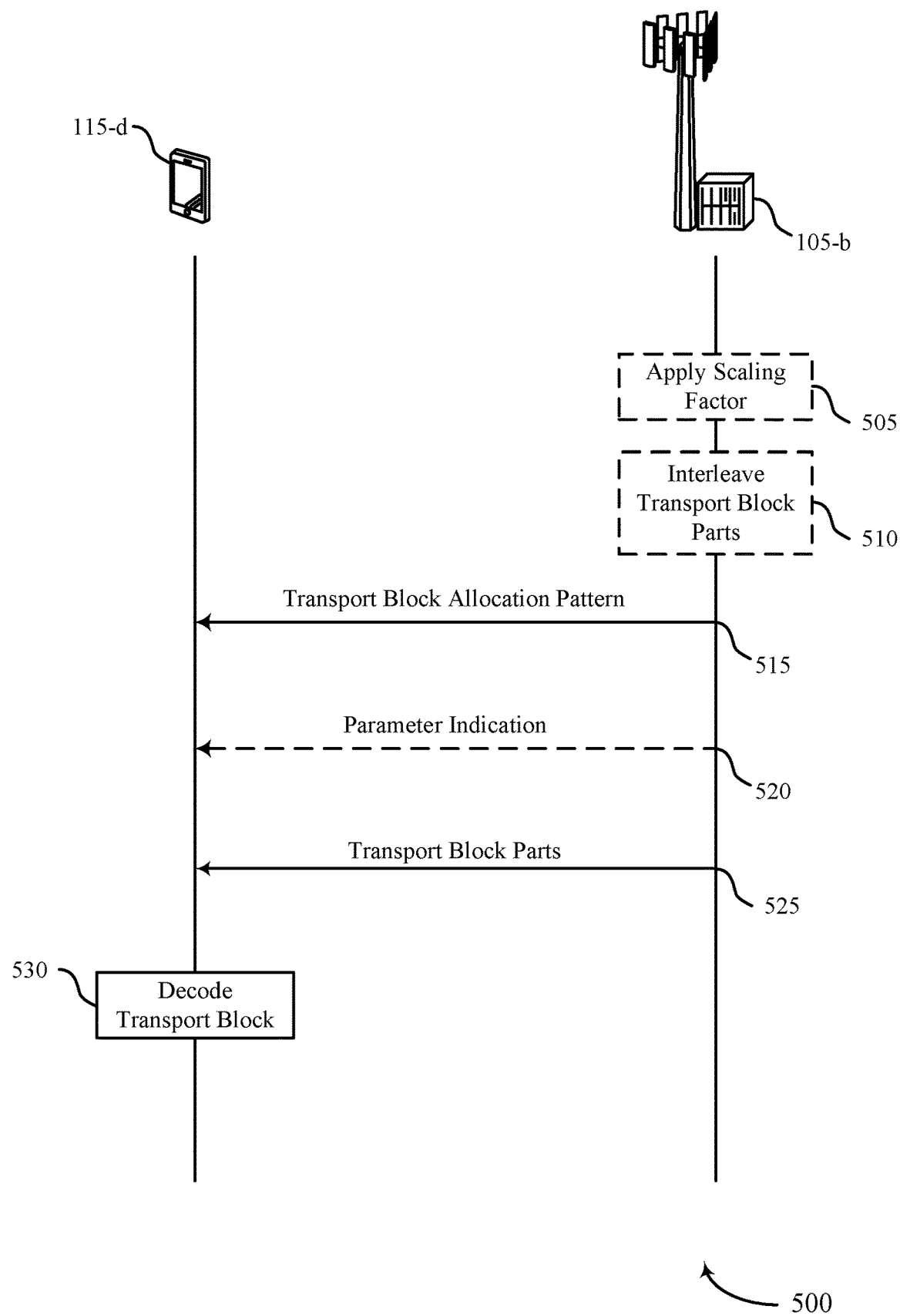
FIG. 5 illustrates an example of a process flow that supports techniques for interleaving a transport block in accordance with aspects of the present disclosure.

FIG. 5 illustrates an example of a process flow 500 that supports techniques for interleaving a transport block in accordance with aspects of the present disclosure. Process flow 500 may implement aspects of wireless communications systems 100 and 200 or may be implemented by aspects of wireless communications systems 100 and 200 as described herein with reference to FIGS. 1 and 2, respectively. Process flow 500 may include a base station 105-*b* and a UE 115-*d*, which may be examples of a base station 105 and a UE 115 as described herein with reference to FIGS. 1 and 2. In the following description of process flow 500, operations between base station 105-*b* and UE 115-*d* as shown may be performed in a different order or at a different time. Some operations may also be omitted from process flow 500, and other operations may be added to process flow 500. In accordance with process flow 500, base station 105-*b* may transmit a transport block allocation pattern to UE 115-*d*. UE 115-*d* may use the transport block allocation pattern to receive and decode a transport block from base station 105-*b*.

At 505, base station 105-*b* may apply a scaling factor to a size of a transport block, thereby increasing the size of the transport block from an initial size to a scaled size. More specifically, base station 105-*b* may apply the scaling factor to a number of bits in the transport block. In some examples, the scaling factor applied to the number of bits may be less than or equal to a predefined maximum scaling factor. In some examples, the scaling factor may equal a number of TTIs (e.g., slots) over which the transport block is to be transmitted. For example, base station 105-*b* may apply a scaling factor (e.g., 4) to the initial size (e.g., 25,000 bits) of the transport block such that the scaled size (e.g., 100,000 bits) is a product of the initial size and the scaling factor. In some examples, base station 105-*b* may transmit an indication of the scaling factor to UE 115-*d* (e.g., in a DCI message, an RRC message, or a MAC-CE). In some other examples, however, the base station 105 *b* may not apply a scaling factor to the size of the transport block. That is, the transport block may be unscaled.

At 510, base station 105-*b* may interleave multiple parts of the transport block across multiple TTIs in accordance with a transport block allocation pattern. In some examples, the transport block allocation pattern may be an example of a time-interleaving pattern. The multiple TTIs may be separated from each other by one or more intervening intervals. That is, base station 105-*b* may interleave the multiple parts of the transport block across non-contiguous slots according to a transport block allocation pattern (e.g., a time-interleaving pattern). In some examples, the one or more intervening intervals separating the multiple non-contiguous TTIs may follow a regular pattern. That is, the one or more intervening intervals may have equivalent durations. In some other examples, the one or more intervening intervals may have different durations. Alternatively, the base station 105-*b* may transmit the multiple parts of the transport block across contiguous TTIs (e.g., slots). That is, the base station 105 *b* may transmit the transport block across multiple adjacent TTIs.

At 515, base station 105-*b* may transmit, to UE 115-*d*, an indication of the transport block allocation pattern applied to the transport block. In some examples, the indication of the transport block allocation pattern may indicate a number of TTIs in the one or more intervening intervals between each of the multiple TTIs over which base station 105-*b* intends to transmit the multiple parts of the transport block. Additionally or alternatively, the indication of the transport block allocation pattern may indicate one or more TDRA table entries. For example, UE 115-*d* may determine the transport block allocation pattern based on a specific TDRA table entry from the indicated one or more TDRA table entries (e.g., from a TDRA table configured for scaled interleaving, or from a TDRA table with entries specific to scaled interleaving). In some examples, the indication of the transport block allocation pattern may also indicate that the transport block is a multicast or broadcast transmission. Additionally or alternatively, the indication of the transport block allocation pattern may indicate that the transport block is interleaved with a unicast transmission. In some examples, base station 105-*b* may transmit the indication of the transport block allocation pattern via a DCI message. In some examples, the DCI message may indicate scheduling information for multiple transport blocks, which may be interleaved according to the transport block allocation pattern.

In some examples, base station 105-*b* may transmit a second indication to UE 115-*d* at 520. The second indication may indicate one or more parameters associated with the transport block, which UE 115-*d* may use to decode the transport block. The one or more parameters may include the scaling factor applied to a number of bits of the transport block, which may be based on a predefined maximum TBS. The second indication may also indicate that each part of the multiple parts of the transport block is mapped to one RV (e.g., an RV 405 as described herein with reference to FIGS. 4A and 4B) of multiple RVs (e.g., five or more RVs). The second indication may also indicate a mapping of each RV of the multiple RVs to a circular buffer (e.g., a circular buffer 400 or 401 as described herein with reference to FIGS. 4A and 4B). More specifically, the mapping may indicate a starting position of a first RV and a starting position of each subsequent RV of the multiple RVs based on an ending position of a previous adjacent RV. Additionally or alternatively, the mapping may indicate a defined starting position of each RV of the multiple RVs.

At 525, base station 105-*b* may transmit the multiple parts of the transport block across the multiple TTIs in accordance with the transport block allocation pattern. In some examples, UE 115-*d* may receive a first set of the multiple parts in a first TTI and may receive a second set of the multiple parts in a second TTI, where the first TTI and the second TTI are separated by a number of TTIs indicated by the transport block allocation pattern.

At 530, UE 115-*d* may decode the transport block based on the multiple parts of the transport block. In some examples, UE 115-*d* may refrain from decoding the transport block until the last TTI of the multiple TTIs. In some examples, UE 115-*d* may identify a coding rate associated with decoding the transport block and may compare the coding rate to a predefined maximum coding rate (e.g., 0.95). The predefined maximum coding rate may be based on the transport block. In such examples, UE 115-*d* may decode the transport block based on the coding rate being less than the predefined maximum coding rate. Alternatively, UE 115-*d* may decode the transport block in the last TTI of the multiple TTIs based on the coding rate being greater than the predefined maximum coding rate. Additionally or alternatively, UE 115-*d* may calculate an overall throughput associated with multiple transmissions (e.g., including the transport block) and may compare the overall throughput to a threshold throughput associated with a capability of UE 115-*d*. In such examples, UE 115-*d* may decode the transport block if the overall throughput is less than the threshold throughput. In some examples, if UE 115-*d* is unable to successfully decode one or more parts of the transport block, UE 115-*d* may transmit HARQ feedback to base station 105-*b*. Accordingly, base station 105-*b* may retransmit (e.g., via unicast) the one or more parts that were unsuccessfully decoded by UE 115-*d*.

Figure 6:
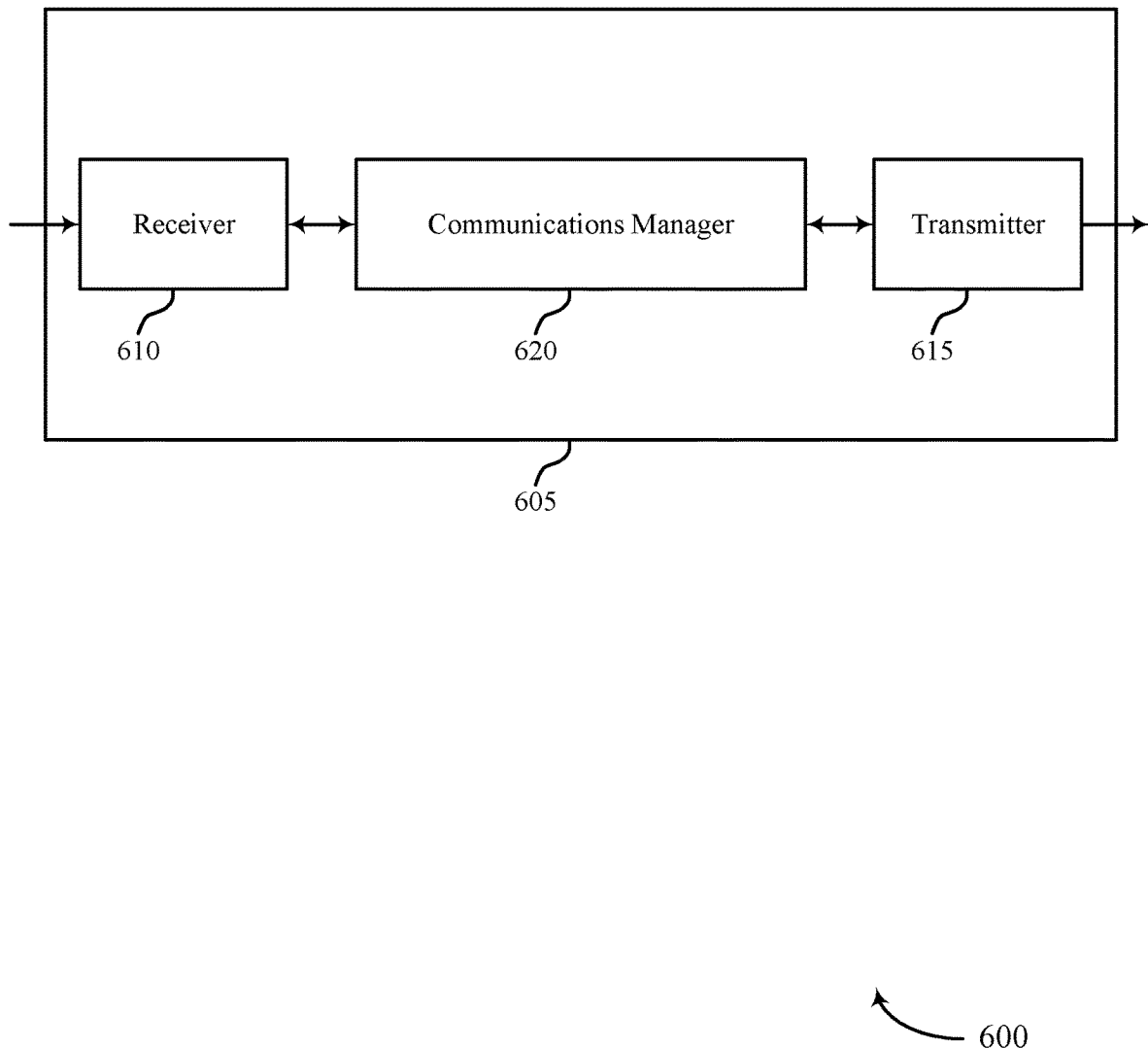
FIGS. 6 and 7 show block diagrams of devices that support techniques for interleaving a transport block in accordance with aspects of the present disclosure.

FIG. 6 shows a block diagram 600 of a device 605 that supports techniques for interleaving a transport block in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for interleaving a transport block). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for interleaving a transport block). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for interleaving a transport block as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for receiving, from a base station, an indication of a transport block allocation pattern to be applied by the UE to receipt of a transport block. The communications manager 620 may be configured as or otherwise support a means for receiving a set of multiple parts of the transport block across a set of multiple TTIs in accordance with the transport block allocation pattern, where the set of multiple TTIs are separated from each other by one or more intervening intervals. The communications manager 620 may be configured as or otherwise support a means for decoding the transport block based on the set of multiple parts of the transport block.

Additionally or alternatively, the communications manager 620 may support wireless communications at a UE in accordance with examples as disclosed herein. For example, the communications manager 620 may be configured as or otherwise support a means for receiving, from a base station, an indication of a transport block allocation pattern to be applied by the UE to receipt of a transport block. The communications manager 620 may be configured as or otherwise support a means for receiving an indication of a scaling factor applied to a number of bits of the transport block. The communications manager 620 may be configured as or otherwise support a means for receiving a set of multiple parts of the transport block across a set of multiple TTIs in accordance with the transport block allocation pattern and as scaled by the scaling factor. The communications manager 620 may be configured as or otherwise support a means for decoding the transport block based on the set of multiple parts of the transport block and based on the scaling factor.

Additionally or alternatively, the communications manager 620 may support wireless communications at a UE in accordance with examples as disclosed herein. For example, the communications manager 620 may be configured as or otherwise support a means for receiving, from a base station, an indication of a transport block allocation pattern to be applied by the UE to receipt of a transport block. The communications manager 620 may be configured as or otherwise support a means for receiving a set of multiple parts of the transport block across a set of multiple TTIs in accordance with the transport block allocation pattern. The communications manager 620 may be configured as or otherwise support a means for calculating an overall throughput in each TTI of the set of TTIs, wherein the overall throughput is associated with a set of multiple received transmissions, the set of multiple received transmissions including the set of multiple parts of the transport block. The communications manager 620 may be configured as or otherwise support a means for comparing the overall throughput in each TTI to a threshold throughput associated with a capability of the UE, where the transport block contributes to the overall throughput only during a last TTI of the set of multiple TTIs. The communications manager 620 may be configured as or otherwise support a means for decoding the set of multiple received transmissions based on the overall throughput in each TTI being less than the threshold throughput.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for more efficient utilization of communication resources.

Figure 7:
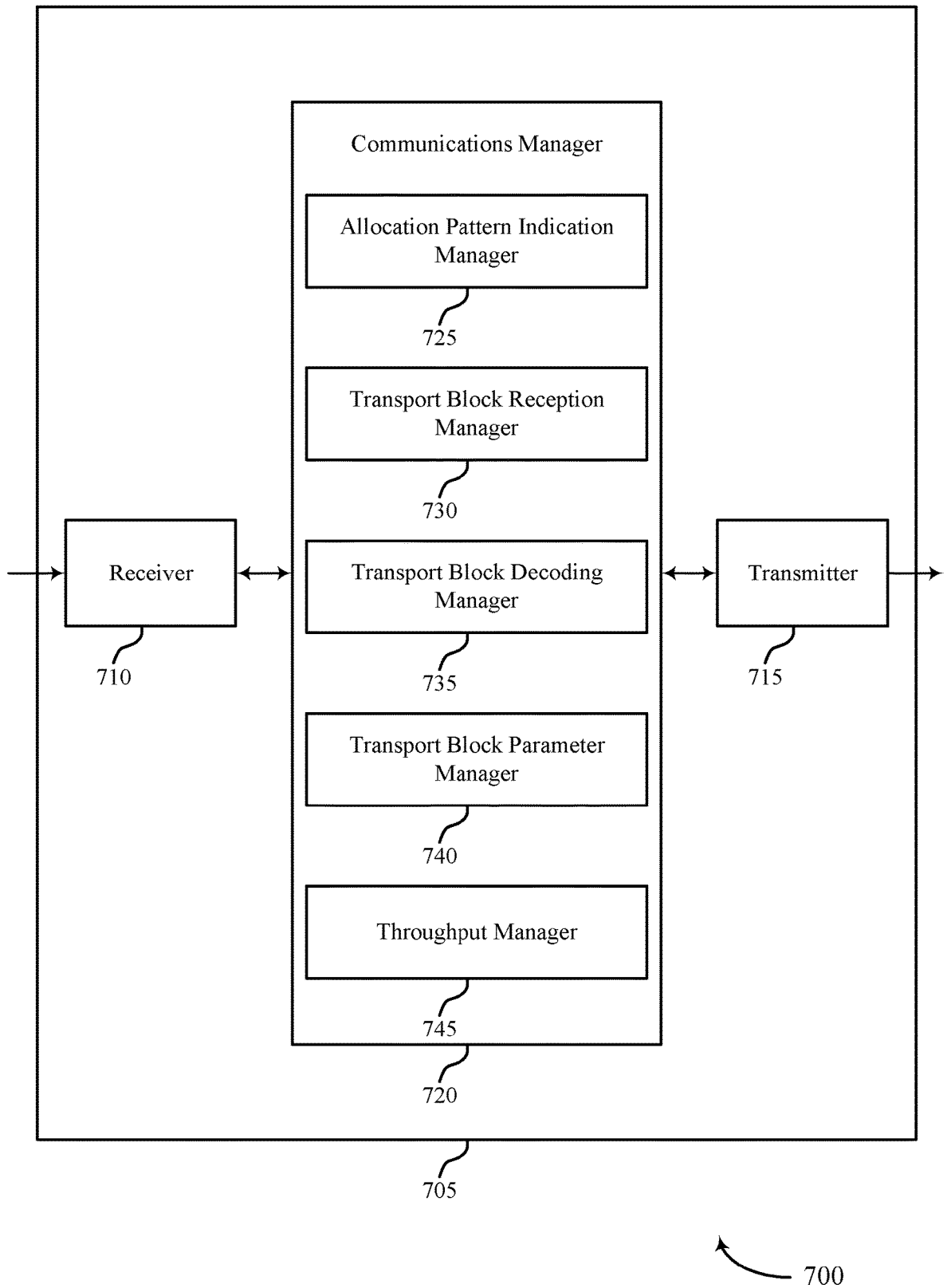

FIG. 7 shows a block diagram 700 of a device 705 that supports techniques for interleaving a transport block in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for interleaving a transport block). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for interleaving a transport block). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for interleaving a transport block as described herein. For example, the communications manager 720 may include an allocation pattern indication manager 725, a transport block reception manager 730, a transport block decoding manager 735, a transport block parameter manager 740, a throughput manager 745, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The allocation pattern indication manager 725 may be configured as or otherwise support a means for receiving, from a base station, an indication of a transport block allocation pattern to be applied by the UE to receipt of a transport block. The transport block reception manager 730 may be configured as or otherwise support a means for receiving a set of multiple parts of the transport block across a set of multiple TTIs in accordance with the transport block allocation pattern, where the set of multiple TTIs are separated from each other by one or more intervening intervals. The transport block decoding manager 735 may be configured as or otherwise support a means for decoding the transport block based on the set of multiple parts of the transport block.

Additionally or alternatively, the communications manager 720 may support wireless communications at a UE in accordance with examples as disclosed herein. The allocation pattern indication manager 725 may be configured as or otherwise support a means for receiving, from a base station, an indication of a transport block allocation pattern to be applied by the UE to receipt of a transport block. The transport block parameter manager 740 may be configured as or otherwise support a means for receiving an indication of a scaling factor applied to a number of bits of the transport block. The transport block reception manager 730 may be configured as or otherwise support a means for receiving a set of multiple parts of the transport block across a set of multiple TTIs in accordance with the transport block allocation pattern and as scaled by the scaling factor. The transport block decoding manager 735 may be configured as or otherwise support a means for decoding the transport block based on the set of multiple parts of the transport block and based on the scaling factor.

Additionally or alternatively, the communications manager 720 may support wireless communications at a UE in accordance with examples as disclosed herein. The allocation pattern indication manager 725 may be configured as or otherwise support a means for receiving, from a base station, an indication of a transport block allocation pattern to be applied by the UE to receipt of a transport block. The transport block reception manager 730 may be configured as or otherwise support a means for receiving a set of multiple parts of the transport block across a set of multiple TTIs in accordance with the transport block allocation pattern. The throughput manager 745 may be configured as or otherwise support a means for calculating an overall throughput in each TTI of the set of TTIs, where the overall throughput is associated with a set of multiple received transmissions, the set of multiple received transmissions including the set of multiple parts of the transport block. The throughput manager 745 may be configured as or otherwise support a means for comparing the overall throughput in each TTI to a threshold throughput associated with a capability of the UE, where the transport block contributes to the overall throughput only during a last TTI of the set of multiple TTIs. The transport block decoding manager 735 may be configured as or otherwise support a means for decoding the set of multiple received transmissions based on overall throughput in each TTI being less than the threshold throughput.

Figure 8:
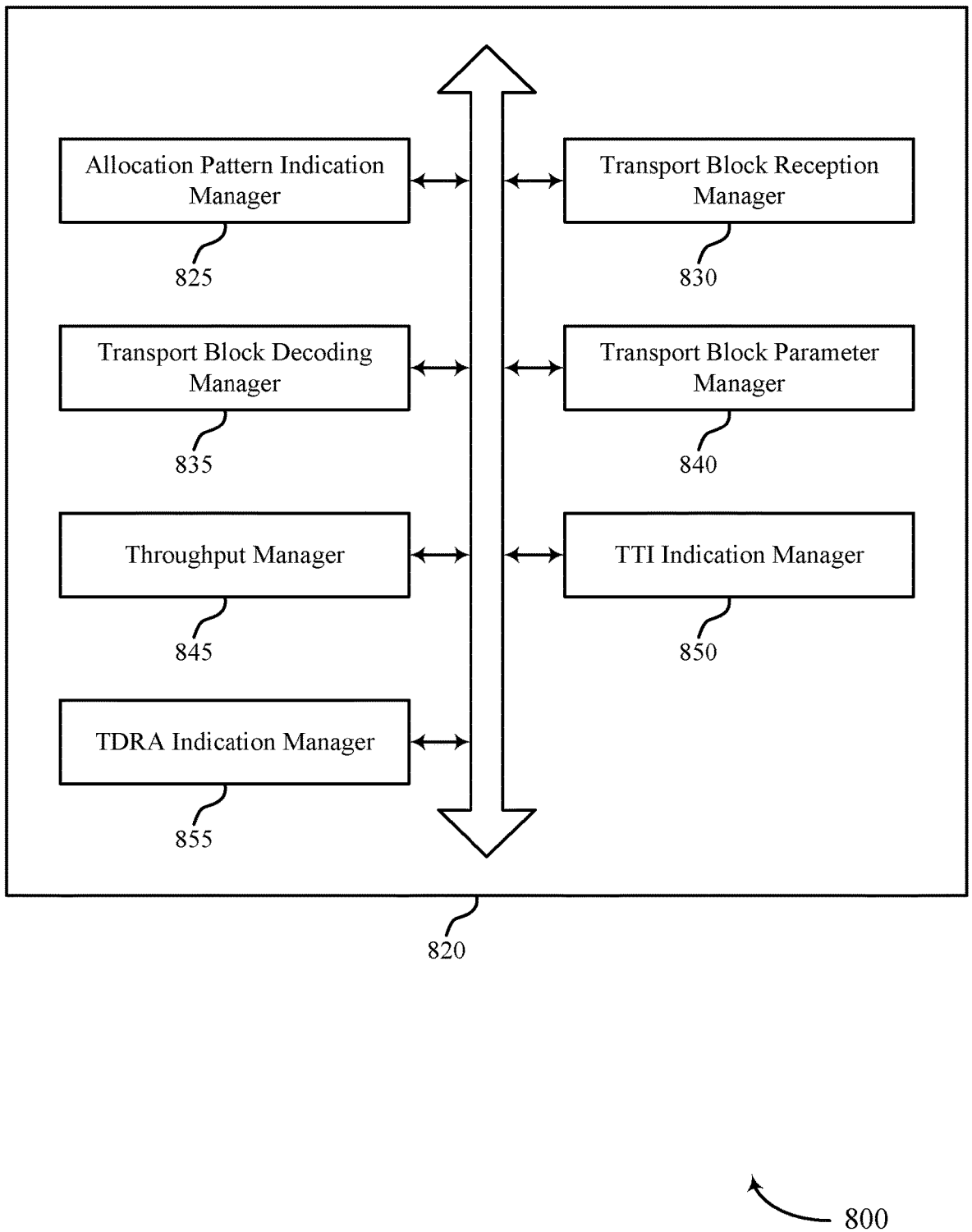
FIG. 8 shows a block diagram of a communications manager that supports techniques for interleaving a transport block in accordance with aspects of the present disclosure.

FIG. 8 shows a block diagram 800 of a communications manager 820 that supports techniques for interleaving a transport block in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for interleaving a transport block as described herein. For example, the communications manager 820 may include an allocation pattern indication manager 825, a transport block reception manager 830, a transport block decoding manager 835, a transport block parameter manager 840, a throughput manager 845, a TTI indication manager 850, a TDRA indication manager 855, or any combination thereof. Each of these components may communicate, directly or indirectly, with one another (e.g., via one or more buses).

The communications manager 820 may support wireless communications at a UE in accordance with examples as disclosed herein. The allocation pattern indication manager 825 may be configured as or otherwise support a means for receiving, from a base station, an indication of a transport block allocation pattern to be applied by the UE to receipt of a transport block. The transport block reception manager 830 may be configured as or otherwise support a means for receiving a set of multiple parts of the transport block across a set of multiple TTIs in accordance with the transport block allocation pattern, where the set of multiple TTIs are separated from each other by one or more intervening intervals. The transport block decoding manager 835 may be configured as or otherwise support a means for decoding the transport block based on the set of multiple parts of the transport block.

In some examples, to support receiving the indication of the transport block allocation pattern, the TTI indication manager 850 may be configured as or otherwise support a means for receiving a message indicating a number of TTIs in the one or more intervening intervals between each TTI of the set of multiple TTIs.

In some examples, the transport block reception manager 830 may be configured as or otherwise support a means for receiving a first set of parts of the set of multiple parts in a first TTI. In some examples, the transport block reception manager 830 may be configured as or otherwise support a means for receiving a second set of parts of the set of multiple parts in a second TTI, the first TTI and the second TTI separated by the number of TTIs in accordance with the transport block allocation pattern.

In some examples, to support receiving the indication of the transport block allocation pattern, the TDRA indication manager 855 may be configured as or otherwise support a means for receiving a message indicating one or more TDRA table entries. In some examples, to support receiving the indication of the transport block allocation pattern, the TDRA indication manager 855 may be configured as or otherwise support a means for receiving an indication of a TDRA table entry of the one or more TDRA table entries, the transport block allocation pattern indicated by the TDRA table entry.

In some examples, the allocation pattern indication manager 825 may be configured as or otherwise support a means for receiving a message indicating the UE is scheduled to receive a second transport block, where the transport block is time-interleaved with the second transport block, the transport block allocation pattern to be applied by the UE to receipt of the transport block and the second transport block.

In some examples, the transport block parameter manager 840 may be configured as or otherwise support a means for receiving an indication of one or more parameters associated with the transport block, where decoding the transport block is based on the one or more parameters.

In some examples, the one or more parameters indicate that each part of the set of multiple parts is mapped to one RV of a set of multiple RVs.

In some examples, to support receiving the indication of the one or more parameters, the transport block parameter manager 840 may be configured as or otherwise support a means for receiving a mapping of each RV of the set of multiple RVs to a circular buffer.

In some examples, the mapping indicates a starting position of a first RV of the set of multiple RVs and a starting position of each subsequent of each RV based on an ending of a previous adjacent RV.

In some examples, the mapping indicates a defined starting position of each RV of the set of multiple RVs, the set of multiple RVs including five or more RVs.

Additionally or alternatively, the communications manager 820 may support wireless communications at a UE in accordance with examples as disclosed herein. In some examples, the allocation pattern indication manager 825 may be configured as or otherwise support a means for receiving, from a base station, an indication of a transport block allocation pattern to be applied by the UE to receipt of a transport block. The transport block parameter manager 840 may be configured as or otherwise support a means for receiving an indication of a scaling factor applied to a number of bits of the transport block. In some examples, the transport block reception manager 830 may be configured as or otherwise support a means for receiving a set of multiple parts of the transport block across a set of multiple TTIs in accordance with the transport block allocation pattern and as scaled by the scaling factor. In some examples, the transport block decoding manager 835 may be configured as or otherwise support a means for decoding the transport block based on the set of multiple parts of the transport block and based on the scaling factor.

In some examples, the transport block parameter manager 840 may be configured as or otherwise support a means for receiving a predefined threshold scaling factor corresponding to the number of bits of the transport block for performing limited buffer rate matching. In some examples, the transport block parameter manager 840 may be configured as or otherwise support a means for receiving a predefined maximum scaling factor for performing LBRM, where the scaling factor is less than or equal to the predefined maximum scaling factor, and where the predefined maximum scaling factor corresponds to the number of bits of the transport block.

In some examples, the transport block parameter manager 840 may be configured as or otherwise support a means for performing limited buffer rate matching, wherein the threshold transport block size is based at least in part on a maximum supported modulation order of the UE, a predefined threshold modulation order independent of a configured modulation order for downlink reception, the predefined threshold scaling factor corresponding to the number of bits of the transport block, a predefined threshold code rate, or a combination thereof. In some examples, the transport block parameter manager 840 may be configured as or otherwise support a means for receiving a predefined maximum TBS for performing LBRM, where the predefined maximum TBS is based on a maximum modulation order of the UE, the predefined maximum scaling factor corresponding to the number of bits of the transport block, a predefined maximum code rate, or a combination thereof.

In some examples, the transport block parameter manager 840 may be configured as or otherwise support a means for identifying a coding rate associated with decoding the transport block in a TTI of the set of multiple TTIs. In some examples, the transport block parameter manager 840 may be configured as or otherwise support a means for comparing the coding rate to a predefined maximum coding rate, where decoding the transport block in the TTI is based on the coding rate being less than the predefined maximum coding rate.

In some examples, the transport block decoding manager 835 may be configured as or otherwise support a means for decoding the transport block in only a last TTI of the set of multiple TTIs based on the coding rate being greater than the predefined maximum coding rate.

In some examples, the predefined maximum coding rate is greater than 0.95.

In some examples, the transport block parameter manager 840 may be configured as or otherwise support a means for receiving an indication that the scaling factor is equal to a number of TTIs across which the set of multiple parts of the transport block are received.

In some examples, the transport block parameter manager 840 may be configured as or otherwise support a means for receiving a message indicating one or more parameters associated with the transport block, where the one or more parameters are associated with the transport block being scaled, the scaling factor being a parameter of the one or more parameters.

In some examples, the one or more parameters indicate that each part of the set of multiple parts is mapped to one RV of a set of multiple RVs.

In some examples, to support receiving the indication of the one or more parameters, the transport block parameter manager 840 may be configured as or otherwise support a means for receiving a mapping of each RV of the set of multiple RVs to a circular buffer.

In some examples, the mapping indicates a starting position of a first RV of the set of multiple RVs and a starting position of each subsequent of each RV based on an ending of a previous adjacent RV.

In some examples, the mapping indicates a defined starting position of each RV of the set of multiple RVs, the set of multiple RVs including five or more RVs.

In some examples, the set of multiple TTIs are separated from each other by one or more intervening intervals.

In some examples, the transport block allocation pattern indicates that the transport block is a multicast or broadcast transmission.

In some examples, the transport block allocation pattern indicates that the multicast or broadcast transmission is interleaved with a unicast transmission.

In some example, the set of TTIs include a contiguous time allocation.

In some examples, the allocation pattern indication manager 825 may be configured as or otherwise support a means for receiving a DCI message indicating scheduling information for a set of multiple transport blocks, where the set of multiple transport blocks are interleaved.

In some examples, to support receiving the indication of the transport block allocation pattern, the allocation pattern indication manager 825 may be configured as or otherwise support a means for receiving a DCI message including the indication.

In some examples, each TTI of the set of multiple TTIs is a slot.

Additionally or alternatively, the communications manager 820 may support wireless communications at a UE in accordance with examples as disclosed herein. In some examples, the allocation pattern indication manager 825 may be configured as or otherwise support a means for receiving, from a base station, an indication of a transport block allocation pattern to be applied by the UE to receipt of a transport block. In some examples, the transport block reception manager 830 may be configured as or otherwise support a means for receiving a set of multiple parts of the transport block across a set of multiple TTIs in accordance with the transport block allocation pattern. The throughput manager 845 may be configured as or otherwise support a means for calculating an overall throughput in each TTI of the set of TTIs, where the overall throughput is associated with a set of multiple received transmissions, the set of multiple received transmissions including the set of multiple parts of the transport block. In some examples, the throughput manager 845 may be configured as or otherwise support a means for comparing the overall throughput in each TTI to a threshold throughput associated with a capability of the UE, where the transport block contributes to the overall throughput only during a last TTI of the set of multiple TTIs. In some examples, the transport block decoding manager 835 may be configured as or otherwise support a means for decoding the set of multiple received transmissions based on the overall throughput in each TTI being less than the threshold throughput.

Figure 9:
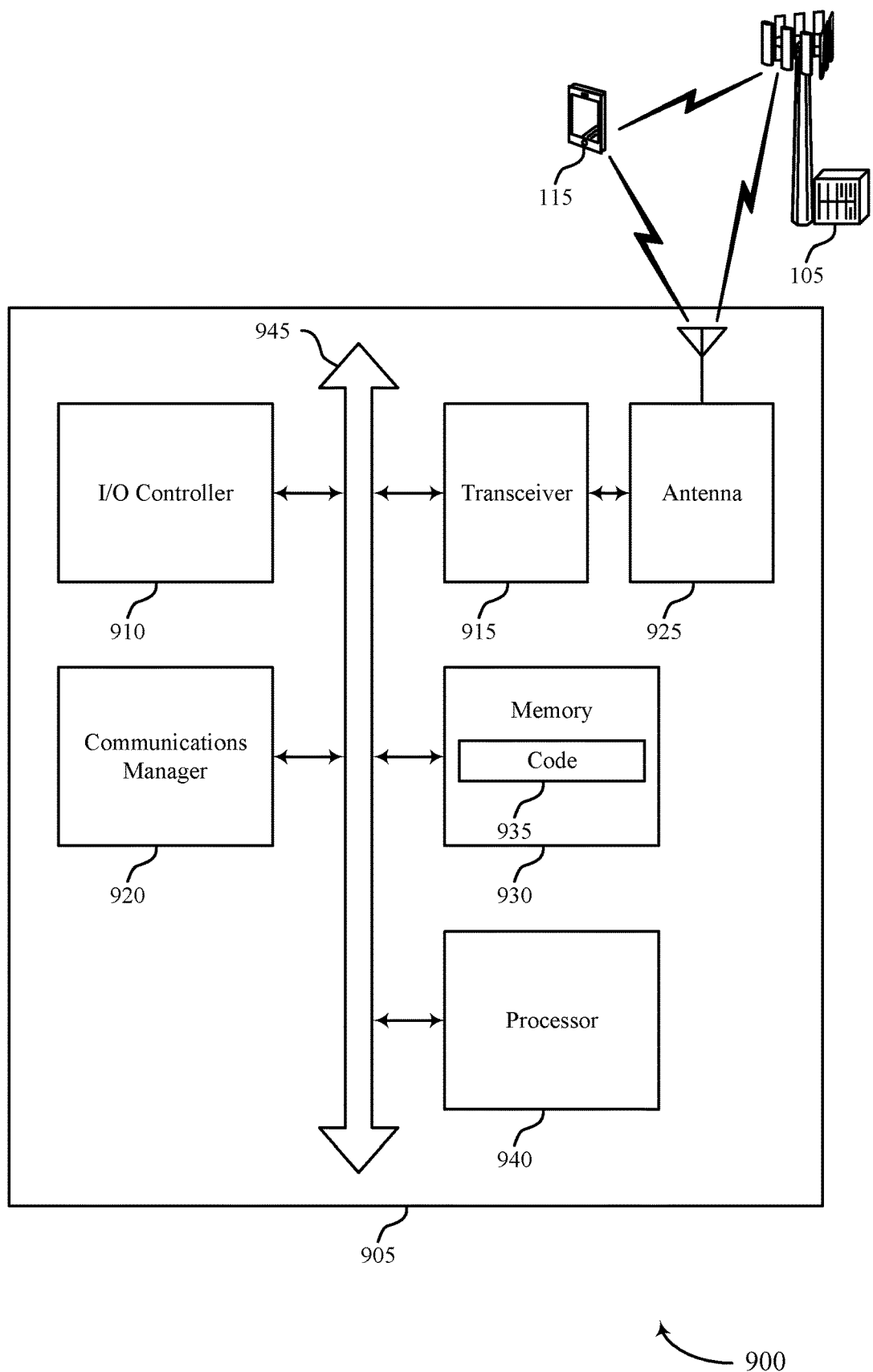
FIG. 9 shows a diagram of a system including a device that supports techniques for interleaving a transport block in accordance with aspects of the present disclosure.

FIG. 9 shows a diagram of a system 900 including a device 905 that supports techniques for interleaving a transport block in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for interleaving a transport block). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving, from a base station, an indication of a transport block allocation pattern to be applied by the UE to receipt of a transport block. The communications manager 920 may be configured as or otherwise support a means for receiving a set of multiple parts of the transport block across a set of multiple TTIs in accordance with the transport block allocation pattern, where the set of multiple TTIs are separated from each other by one or more intervening intervals. The communications manager 920 may be configured as or otherwise support a means for decoding the transport block based on the set of multiple parts of the transport block.

Additionally or alternatively, the communications manager 920 may support wireless communications at a UE in accordance with examples as disclosed herein. For example, the communications manager 920 may be configured as or otherwise support a means for receiving, from a base station, an indication of a transport block allocation pattern to be applied by the UE to receipt of a transport block. The communications manager 920 may be configured as or otherwise support a means for receiving an indication of a scaling factor applied to a number of bits of the transport block. The communications manager 920 may be configured as or otherwise support a means for receiving a set of multiple parts of the transport block across a set of multiple TTIs in accordance with the transport block allocation pattern and as scaled by the scaling factor. The communications manager 920 may be configured as or otherwise support a means for decoding the transport block based on the set of multiple parts of the transport block and based on the scaling factor.

Additionally or alternatively, the communications manager 920 may support wireless communications at a UE in accordance with examples as disclosed herein. For example, the communications manager 920 may be configured as or otherwise support a means for receiving, from a base station, an indication of a transport block allocation pattern to be applied by the UE to receipt of a transport block. The communications manager 920 may be configured as or otherwise support a means for receiving a set of multiple parts of the transport block across a set of multiple TTIs in accordance with the transport block allocation pattern. The communications manager 920 may be configured as or otherwise support a means for calculating an overall throughput in each TTI of the set of TTIs, where the overall throughput is associated with a set of multiple received transmissions, the set of multiple received transmissions including the set of multiple parts of the transport block. The communications manager 920 may be configured as or otherwise support a means for comparing the overall throughput in each TTI to a threshold throughput associated with a capability of the UE, where the transport block contributes to the overall throughput only during a last TTI of the set of multiple TTIs. The communications manager 920 may be configured as or otherwise support a means for decoding the set of multiple received transmissions based on the overall throughput in each TTI being less than the threshold throughput.

By including or configuring the communications manager 920 in accordance with examples as described herein, the device 905 may support techniques for improved communication reliability, reduced latency, more efficient utilization of communication resources, and improved coordination between devices.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for interleaving a transport block as described herein, or the processor 940 and the memory 930 may be otherwise configured to perform or support such operations.

Figure 10:
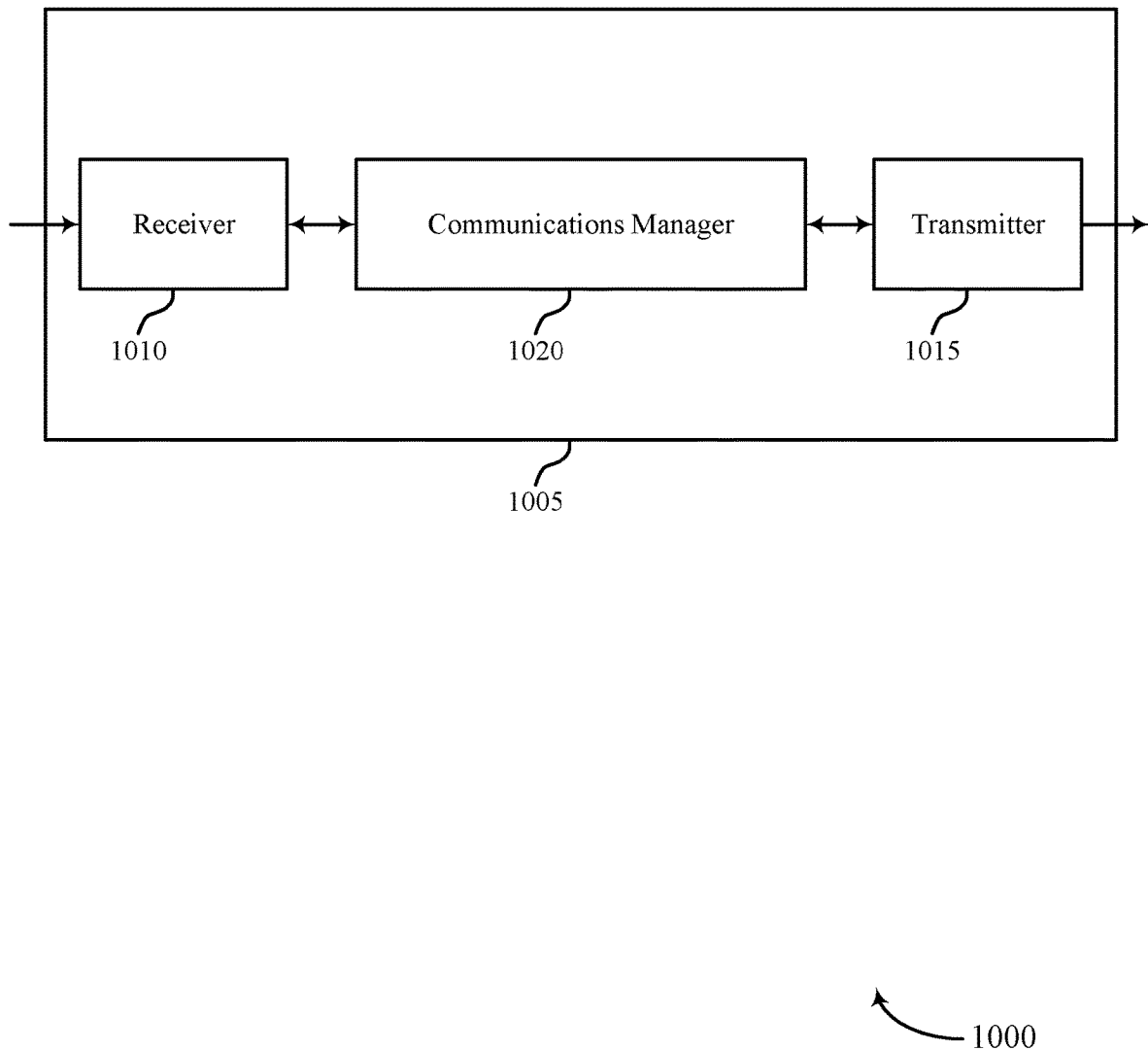
FIGS. 10 and 11 show block diagrams of devices that support techniques for interleaving a transport block in accordance with aspects of the present disclosure.

FIG. 10 shows a block diagram 1000 of a device 1005 that supports techniques for interleaving a transport block in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for interleaving a transport block). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for interleaving a transport block). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for interleaving a transport block as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for applying a scaling factor to a transport block of a first size, the scaling factor increasing the transport block from the first size to a second size. The communications manager 1020 may be configured as or otherwise support a means for interleaving a set of multiple parts of the transport block of the second size across a set of multiple TTIs in accordance with a transport block allocation pattern, where the set of multiple TTIs are separated from each other by one or more intervening intervals. The communications manager 1020 may be configured as or otherwise support a means for transmitting, to a UE, an indication of the transport block allocation pattern applied to the transport block of the second size. The communications manager 1020 may be configured as or otherwise support a means for transmitting the set of multiple parts of the transport block of the second size across the set of multiple TTIs in accordance with the transport block allocation pattern.

Additionally or alternatively, the communications manager 1020 may support wireless communications at a base station in accordance with examples as disclosed herein. For example, the communications manager 1020 may be configured as or otherwise support a means for applying a scaling factor to a number of bits of a transport block of a first size, the scaling factor increasing the transport block from the first size to a second size. The communications manager 1020 may be configured as or otherwise support a means for interleaving a set of multiple parts of the transport block of the second size across a set of multiple TTIs in accordance with a transport block allocation pattern. The communications manager 1020 may be configured as or otherwise support a means for transmitting, to a UE, an indication of the transport block allocation pattern applied to the transport block of the second size. The communications manager 1020 may be configured as or otherwise support a means for transmitting an indication of the scaling factor applied to the number of bits of the transport block of the first size. The communications manager 1020 may be configured as or otherwise support a means for transmitting the set of multiple parts of the transport block of the second size across the set of multiple TTIs in accordance with the transport block allocation pattern and as scaled by the scaling factor.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for more efficient utilization of communication resources.

Figure 11:
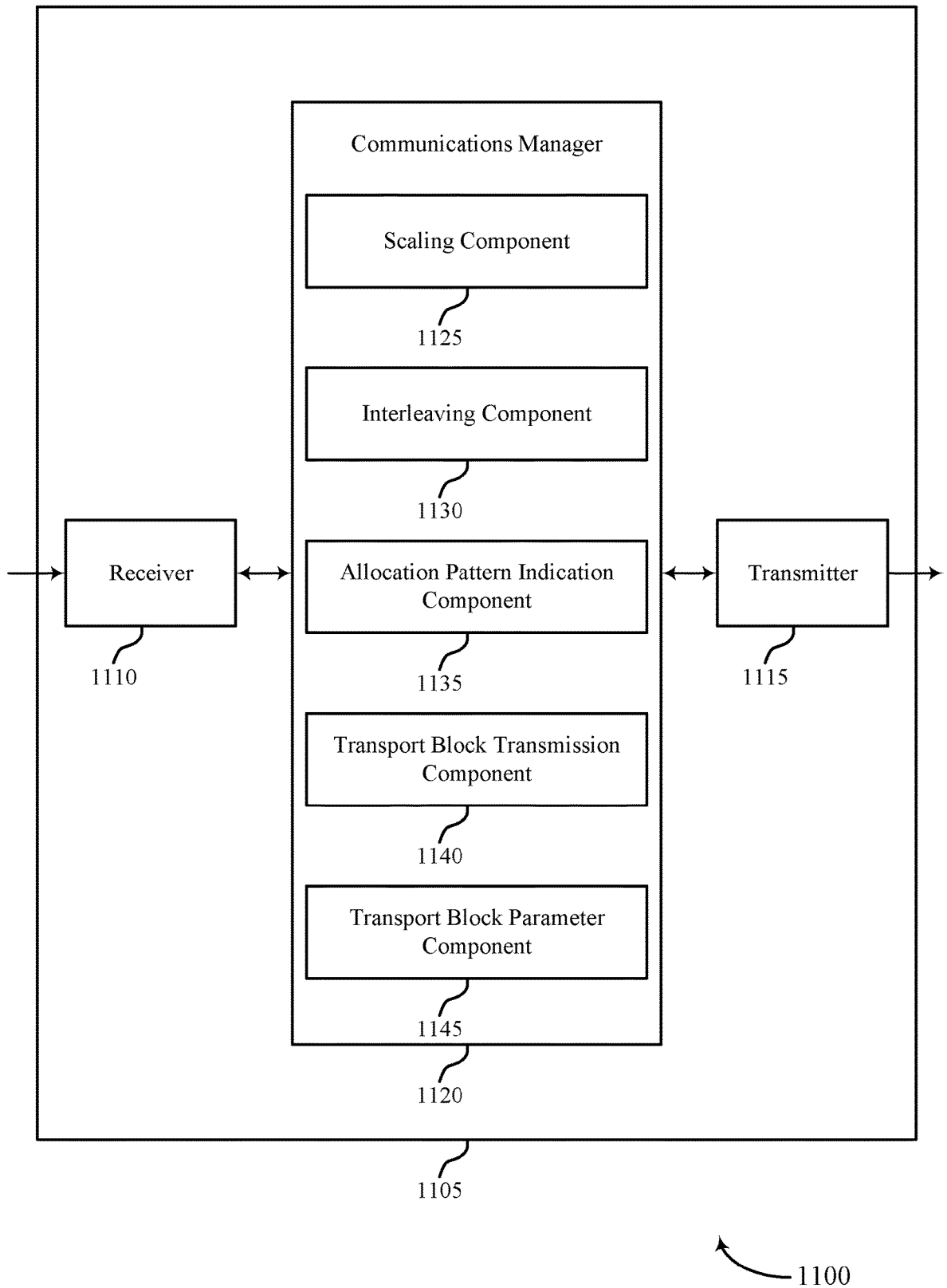

FIG. 11 shows a block diagram 1100 of a device 1105 that supports techniques for interleaving a transport block in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for interleaving a transport block). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for interleaving a transport block). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for interleaving a transport block as described herein. For example, the communications manager 1120 may include a scaling component 1125, an interleaving component 1130, an allocation pattern indication component 1135, a transport block transmission component 1140, a transport block parameter component 1145, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The scaling component 1125 may be configured as or otherwise support a means for applying a scaling factor to a transport block of a first size, the scaling factor increasing the transport block from the first size to a second size. The interleaving component 1130 may be configured as or otherwise support a means for interleaving a set of multiple parts of the transport block of the second size across a set of multiple TTIs in accordance with a transport block allocation pattern, where the set of multiple TTIs are separated from each other by one or more intervening intervals. The allocation pattern indication component 1135 may be configured as or otherwise support a means for transmitting, to a UE, an indication of the transport block allocation pattern applied to the transport block of the second size. The transport block transmission component 1140 may be configured as or otherwise support a means for transmitting the set of multiple parts of the transport block of the second size across the set of multiple TTIs in accordance with the transport block allocation pattern.

Additionally or alternatively, the communications manager 1120 may support wireless communications at a base station in accordance with examples as disclosed herein. The scaling component 1125 may be configured as or otherwise support a means for applying a scaling factor to a number of bits of a transport block of a first size, the scaling factor increasing the transport block from the first size to a second size. The interleaving component 1130 may be configured as or otherwise support a means for interleaving a set of multiple parts of the transport block of the second size across a set of multiple TTIs in accordance with a transport block allocation pattern. The allocation pattern indication component 1135 may be configured as or otherwise support a means for transmitting, to a UE, an indication of the transport block allocation pattern applied to the transport block of the second size. The transport block parameter component 1145 may be configured as or otherwise support a means for transmitting an indication of the scaling factor applied to the number of bits of the transport block of the first size. The transport block transmission component 1140 may be configured as or otherwise support a means for transmitting the set of multiple parts of the transport block of the second size across the set of multiple TTIs in accordance with the transport block allocation pattern and as scaled by the scaling factor.

Figure 12:
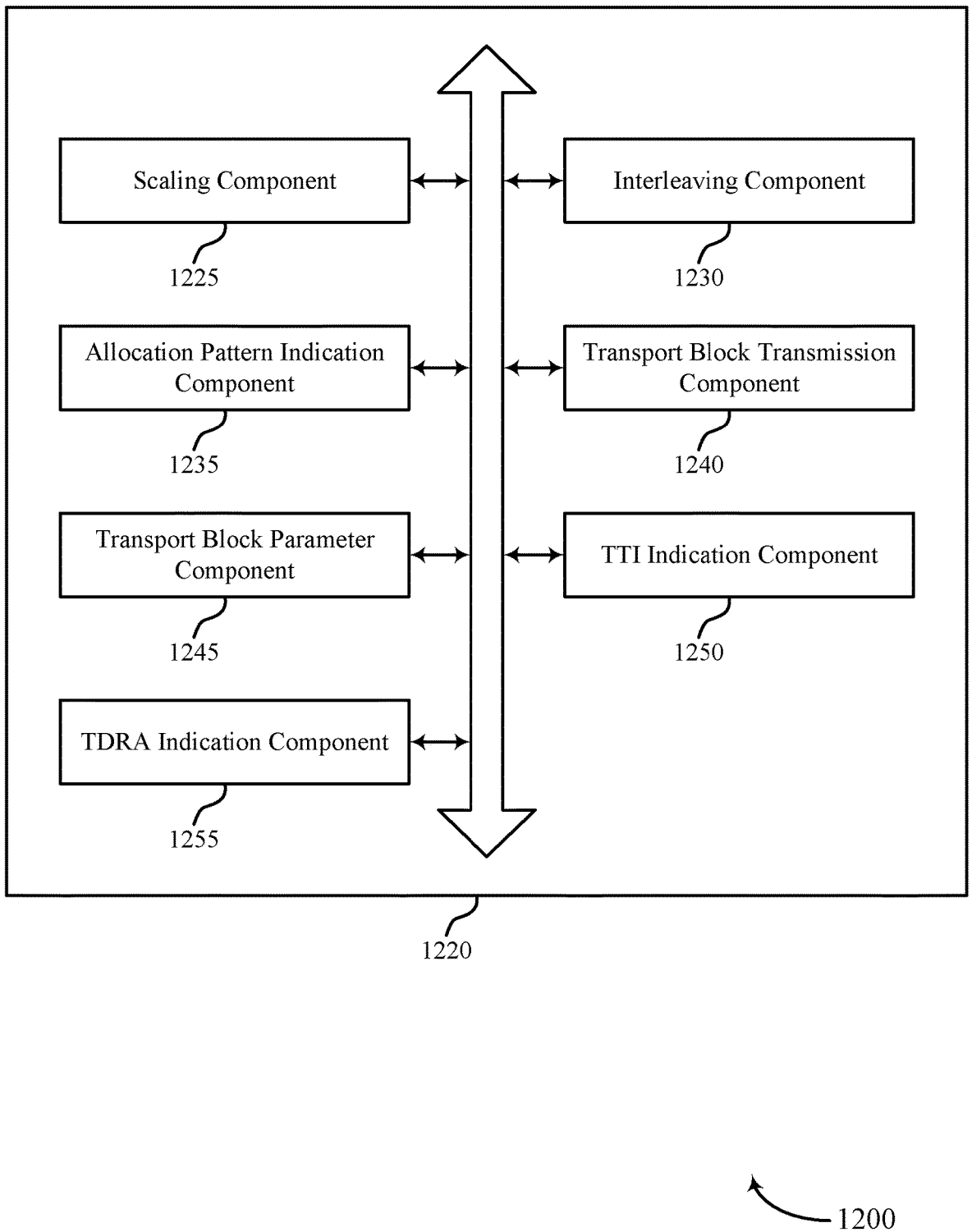
FIG. 12 shows a block diagram of a communications manager that supports techniques for interleaving a transport block in accordance with aspects of the present disclosure.

FIG. 12 shows a block diagram 1200 of a communications manager 1220 that supports techniques for interleaving a transport block in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of techniques for interleaving a transport block as described herein. For example, the communications manager 1220 may include a scaling component 1225, an interleaving component 1230, an allocation pattern indication component 1235, a transport block transmission component 1240, a transport block parameter component 1245, a TTI indication component 1250, a TDRA indication component 1255, or any combination thereof. Each of these components may communicate, directly or indirectly, with one another (e.g., via one or more buses).

The communications manager 1220 may support wireless communications at a base station in accordance with examples as disclosed herein. The scaling component 1225 may be configured as or otherwise support a means for applying a scaling factor to a transport block of a first size, the scaling factor increasing the transport block from the first size to a second size. The interleaving component 1230 may be configured as or otherwise support a means for interleaving a set of multiple parts of the transport block of the second size across a set of multiple TTIs in accordance with a transport block allocation pattern, where the set of multiple TTIs are separated from each other by one or more intervening intervals. The allocation pattern indication component 1235 may be configured as or otherwise support a means for transmitting, to a UE, an indication of the transport block allocation pattern applied to the transport block of the second size. The transport block transmission component 1240 may be configured as or otherwise support a means for transmitting the set of multiple parts of the transport block of the second size across the set of multiple TTIs in accordance with the transport block allocation pattern.

In some examples, to support transmitting the indication of the transport block allocation pattern, the TTI indication component 1250 may be configured as or otherwise support a means for transmitting a message indicating a number of TTIs in the one or more intervening intervals between each TTI of the set of multiple TTIs.

In some examples, the transport block transmission component 1240 may be configured as or otherwise support a means for transmitting a first set of parts of the set of multiple parts in a first TTI. In some examples, the transport block transmission component 1240 may be configured as or otherwise support a means for transmitting a second set of parts of the set of multiple parts in a second TTI, the first TTI and the second TTI separated by the number of TTIs in accordance with the transport block allocation pattern.

In some examples, to support transmitting the indication of the transport block allocation pattern, the TDRA indication component 1255 may be configured as or otherwise support a means for transmitting a message indicating one or more TDRA table entries. In some examples, to support transmitting the indication of the transport block allocation pattern, the TDRA indication component 1255 may be configured as or otherwise support a means for transmitting an indication of a TDRA table entry of the one or more TDRA table entries, the transport block allocation pattern indicated by the TDRA table entry.

In some examples, the allocation pattern indication component 1235 may be configured as or otherwise support a means for transmitting a message indicating the UE is scheduled to receive a second transport block, where the transport block of the second size is time-interleaved with the second transport block in accordance with the transport block allocation pattern.

In some examples, the transport block parameter component 1245 may be configured as or otherwise support a means for transmitting an indication of one or more parameters associated with the transport block.

In some examples, the one or more parameters indicate that each part of the set of multiple parts is mapped to one RV of a set of multiple RVs.

In some examples, to support transmitting the indication of the one or more parameters, the transport block parameter component 1245 may be configured as or otherwise support a means for transmitting a mapping of each RV of the set of multiple RVs to a circular buffer.

In some examples, the mapping indicates a starting position of a first RV of the set of multiple RVs and a starting position of each subsequent of each RV based on an ending of a previous adjacent RV.

In some examples, the mapping indicates a defined starting position of each RV of the set of multiple RVs, the set of multiple RVs including five or more RVs.

Additionally or alternatively, the communications manager 1220 may support wireless communications at a base station in accordance with examples as disclosed herein. In some examples, the scaling component 1225 may be configured as or otherwise support a means for applying a scaling factor to a number of bits of a transport block of a first size, the scaling factor increasing the transport block from the first size to a second size. In some examples, the interleaving component 1230 may be configured as or otherwise support a means for interleaving a set of multiple parts of the transport block of the second size across a set of multiple TTIs in accordance with a transport block allocation pattern. In some examples, the allocation pattern indication component 1235 may be configured as or otherwise support a means for transmitting, to a UE, an indication of the transport block allocation pattern applied to the transport block of the second size. The transport block parameter component 1245 may be configured as or otherwise support a means for transmitting an indication of the scaling factor applied to the number of bits of the transport block of the first size. In some examples, the transport block transmission component 1240 may be configured as or otherwise support a means for transmitting the set of multiple parts of the transport block of the second size across the set of multiple TTIs in accordance with the transport block allocation pattern and as scaled by the scaling factor.

In some examples, the transport block parameter component 1245 may be configured as or otherwise support a means for transmitting a predefined maximum scaling factor for performing LBRM, where the scaling factor is less than or equal to the predefined maximum scaling factor, and where the predefined maximum scaling factor corresponds to the number of bits of the transport block.

In some examples, the transport block parameter component 1245 may be configured as or otherwise support a means for transmitting a predefined maximum TBS for performing LBRM, where the predefined maximum TBS is based on a maximum modulation order of the UE, the predefined maximum scaling factor corresponding to the number of bits of the transport block, a predefined maximum code rate, or a combination thereof.

In some examples, the transport block parameter component 1245 may be configured as or otherwise support a means for transmitting an indication that the scaling factor is equal to a number of TTIs across which the set of multiple parts of the transport block are transmitted.

In some examples, the transport block parameter component 1245 may be configured as or otherwise support a means for transmitting a message indicating one or more parameters associated with the transport block, where the one or more parameters are associated with the transport block being scaled, the scaling factor being a parameter of the one or more parameters.

In some examples, the one or more parameters indicate that each part of the set of multiple parts is mapped to one RV of a set of multiple RVs.

In some examples, to support transmitting the indication of the one or more parameters, the transport block parameter component 1245 may be configured as or otherwise support a means for transmitting a mapping of each RV of the set of multiple RVs to a circular buffer.

In some examples, the mapping indicates a starting position of a first RV of the set of multiple RVs and a starting position of each subsequent of each RV based on an ending of a previous adjacent RV.

In some examples, the mapping indicates a defined starting position of each RV of the set of multiple RVs, the set of multiple RVs including five or more RVs.

In some examples, the set of multiple TTIs are separated from each other by one or more intervening intervals.

In some examples, the transport block allocation pattern indicates that the transport block is a multicast or broadcast transmission.

In some examples, the transport block allocation pattern indicates that the multicast or broadcast transmission is interleaved with a unicast transmission.

In some examples, the allocation pattern indication component 1235 may be configured as or otherwise support a means for transmitting a DCI message indicating scheduling information for a set of multiple transport blocks, where the set of multiple transport blocks are interleaved.

In some examples, to support transmitting the indication of the transport block allocation pattern, the allocation pattern indication component 1235 may be configured as or otherwise support a means for transmitting a DCI message including the indication.

In some examples, each TTI of the set of multiple TTIs is a slot.

Figure 13:
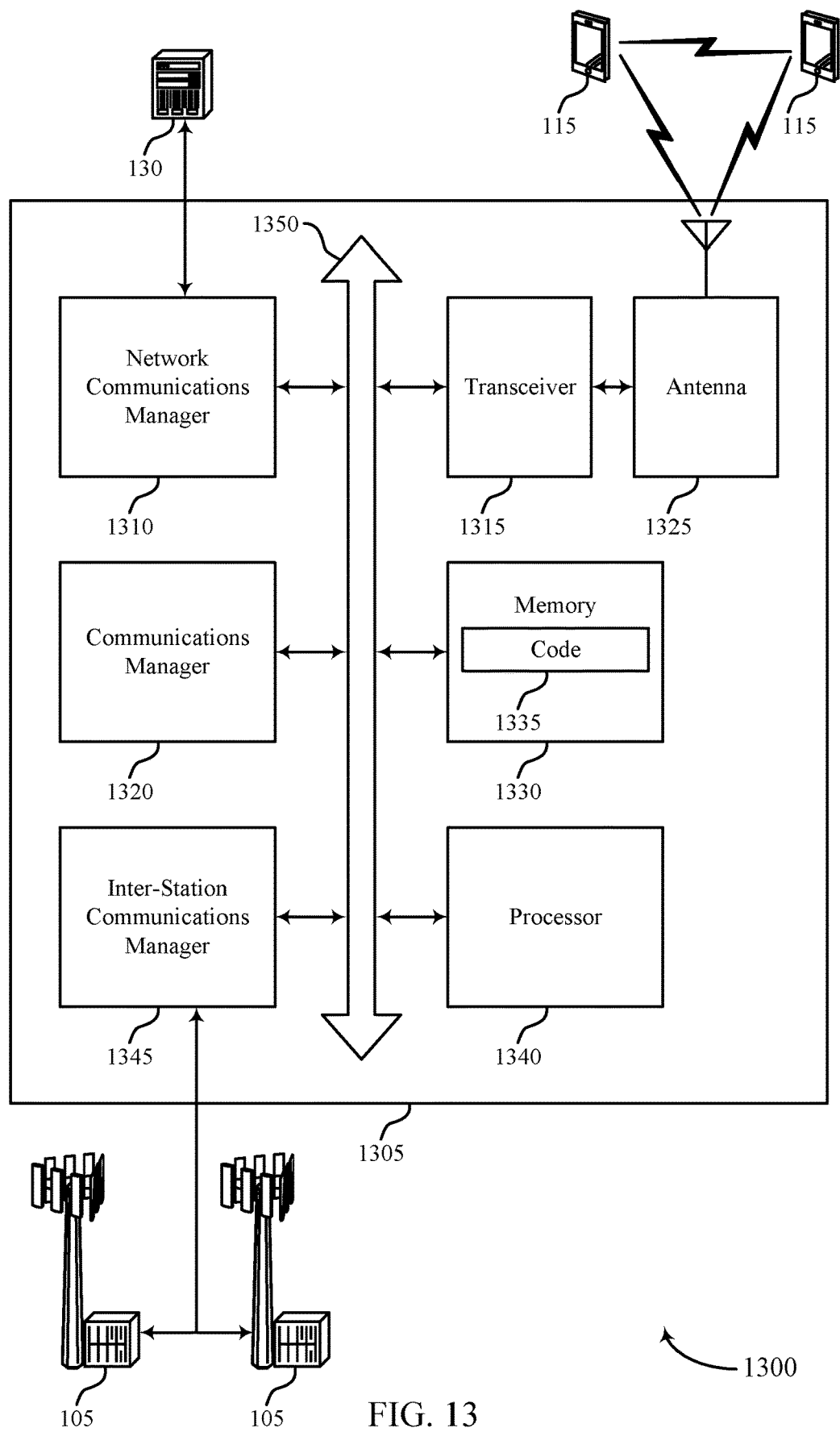
FIG. 13 shows a diagram of a system including a device that supports techniques for interleaving a transport block in accordance with aspects of the present disclosure.

FIG. 13 shows a diagram of a system 1300 including a device 1305 that supports techniques for interleaving a transport block in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for interleaving a transport block). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for applying a scaling factor to a transport block of a first size, the scaling factor increasing the transport block from the first size to a second size. The communications manager 1320 may be configured as or otherwise support a means for interleaving a set of multiple parts of the transport block of the second size across a set of multiple TTIs in accordance with a transport block allocation pattern, where the set of multiple TTIs are separated from each other by one or more intervening intervals. The communications manager 1320 may be configured as or otherwise support a means for transmitting, to a UE, an indication of the transport block allocation pattern applied to the transport block of the second size. The communications manager 1320 may be configured as or otherwise support a means for transmitting the set of multiple parts of the transport block of the second size across the set of multiple TTIs in accordance with the transport block allocation pattern.

Additionally or alternatively, the communications manager 1320 may support wireless communications at a base station in accordance with examples as disclosed herein. For example, the communications manager 1320 may be configured as or otherwise support a means for applying a scaling factor to a number of bits of a transport block of a first size, the scaling factor increasing the transport block from the first size to a second size. The communications manager 1320 may be configured as or otherwise support a means for interleaving a set of multiple parts of the transport block of the second size across a set of multiple TTIs in accordance with a transport block allocation pattern. The communications manager 1320 may be configured as or otherwise support a means for transmitting, to a UE, an indication of the transport block allocation pattern applied to the transport block of the second size. The communications manager 1320 may be configured as or otherwise support a means for transmitting an indication of the scaling factor applied to the number of bits of the transport block of the first size. The communications manager 1320 may be configured as or otherwise support a means for transmitting the set of multiple parts of the transport block of the second size across the set of multiple TTIs in accordance with the transport block allocation pattern and as scaled by the scaling factor.

By including or configuring the communications manager 1320 in accordance with examples as described herein, the device 1305 may support techniques for improved communication reliability, reduced latency, more efficient utilization of communication resources, and improved coordination between devices.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for interleaving a transport block as described herein, or the processor 1340 and the memory 1330 may be otherwise configured to perform or support such operations.

Figure 14:
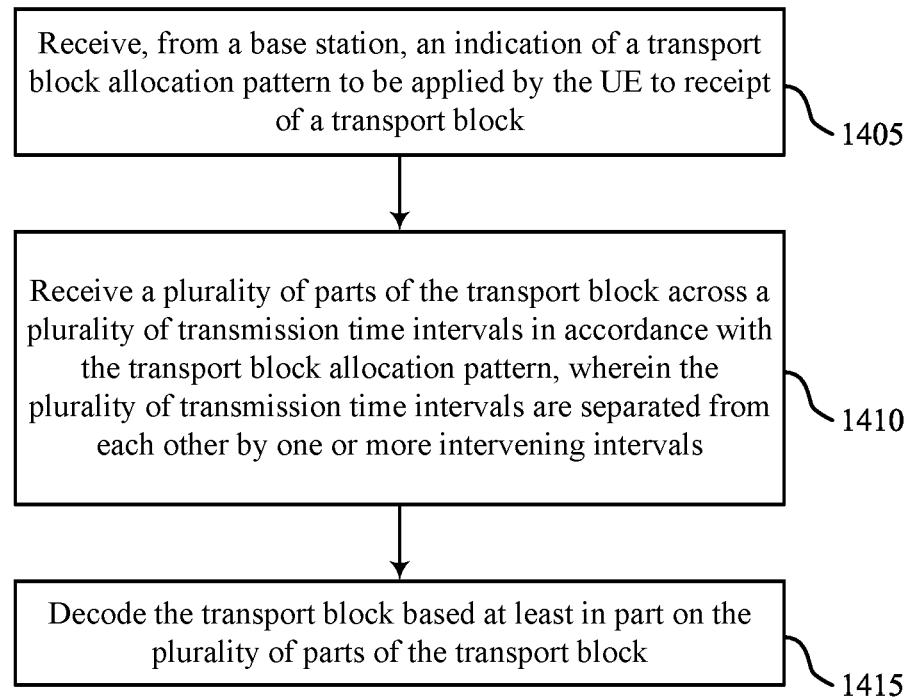
FIGS. 14 through 20 show flowcharts illustrating methods that support techniques for interleaving a transport block in accordance with aspects of the present disclosure.

FIG. 14 shows a flowchart illustrating a method 1400 that supports techniques for interleaving a transport block in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, an indication of a transport block allocation pattern to be applied by the UE to receipt of a transport block. The operations of 1405 may be performed in accordance with examples as disclosed herein. In some examples, aspects of the operations of 1405 may be performed by an allocation pattern indication manager 825 as described with reference to FIG. 8.

At 1410, the method may include receiving a set of multiple parts of the transport block across a set of multiple TTIs in accordance with the transport block allocation pattern, where the set of multiple TTIs are separated from each other by one or more intervening intervals. The operations of 1410 may be performed in accordance with examples as disclosed herein. In some examples, aspects of the operations of 1410 may be performed by a transport block reception manager 830 as described with reference to FIG. 8.

At 1415, the method may include decoding the transport block based on the set of multiple parts of the transport block. The operations of 1415 may be performed in accordance with examples as disclosed herein. In some examples, aspects of the operations of 1415 may be performed by a transport block decoding manager 835 as described with reference to FIG. 8.

Figure 15:
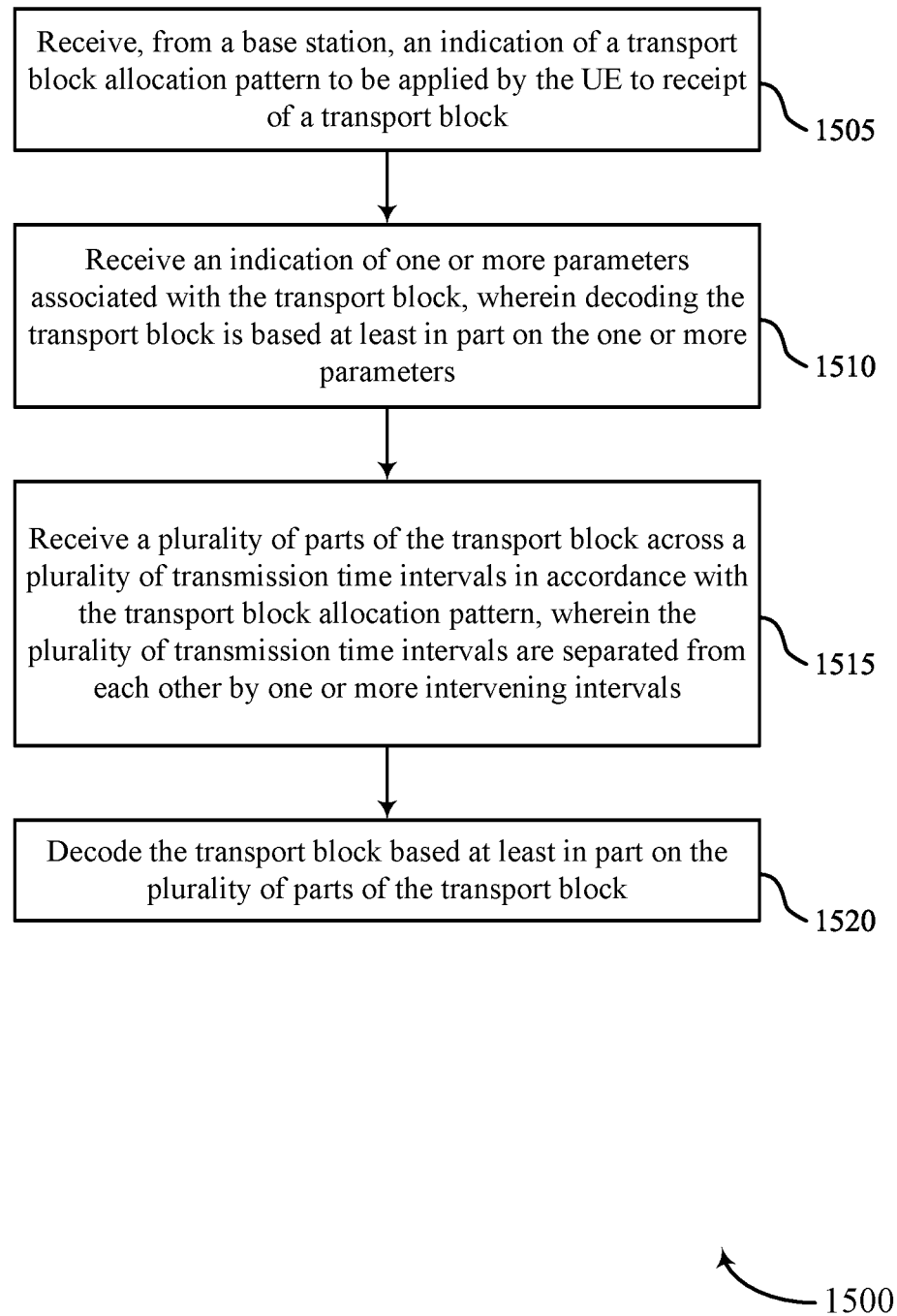

FIG. 15 shows a flowchart illustrating a method 1500 that supports techniques for interleaving a transport block in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, an indication of a transport block allocation pattern to be applied by the UE to receipt of a transport block. The operations of 1505 may be performed in accordance with examples as disclosed herein. In some examples, aspects of the operations of 1505 may be performed by an allocation pattern indication manager 825 as described with reference to FIG. 8.

At 1510, the method may include receiving an indication of one or more parameters associated with the transport block, where decoding the transport block is based on the one or more parameters. The operations of 1510 may be performed in accordance with examples as disclosed herein. In some examples, aspects of the operations of 1510 may be performed by a transport block parameter manager 840 as described with reference to FIG. 8.

At 1515, the method may include receiving a set of multiple parts of the transport block across a set of multiple TTIs in accordance with the transport block allocation pattern, where the set of multiple TTIs are separated from each other by one or more intervening intervals. The operations of 1515 may be performed in accordance with examples as disclosed herein. In some examples, aspects of the operations of 1515 may be performed by a transport block reception manager 830 as described with reference to FIG. 8.

At 1520, the method may include decoding the transport block based on the set of multiple parts of the transport block. The operations of 1520 may be performed in accordance with examples as disclosed herein. In some examples, aspects of the operations of 1520 may be performed by a transport block decoding manager 835 as described with reference to FIG. 8.

Figure 16:
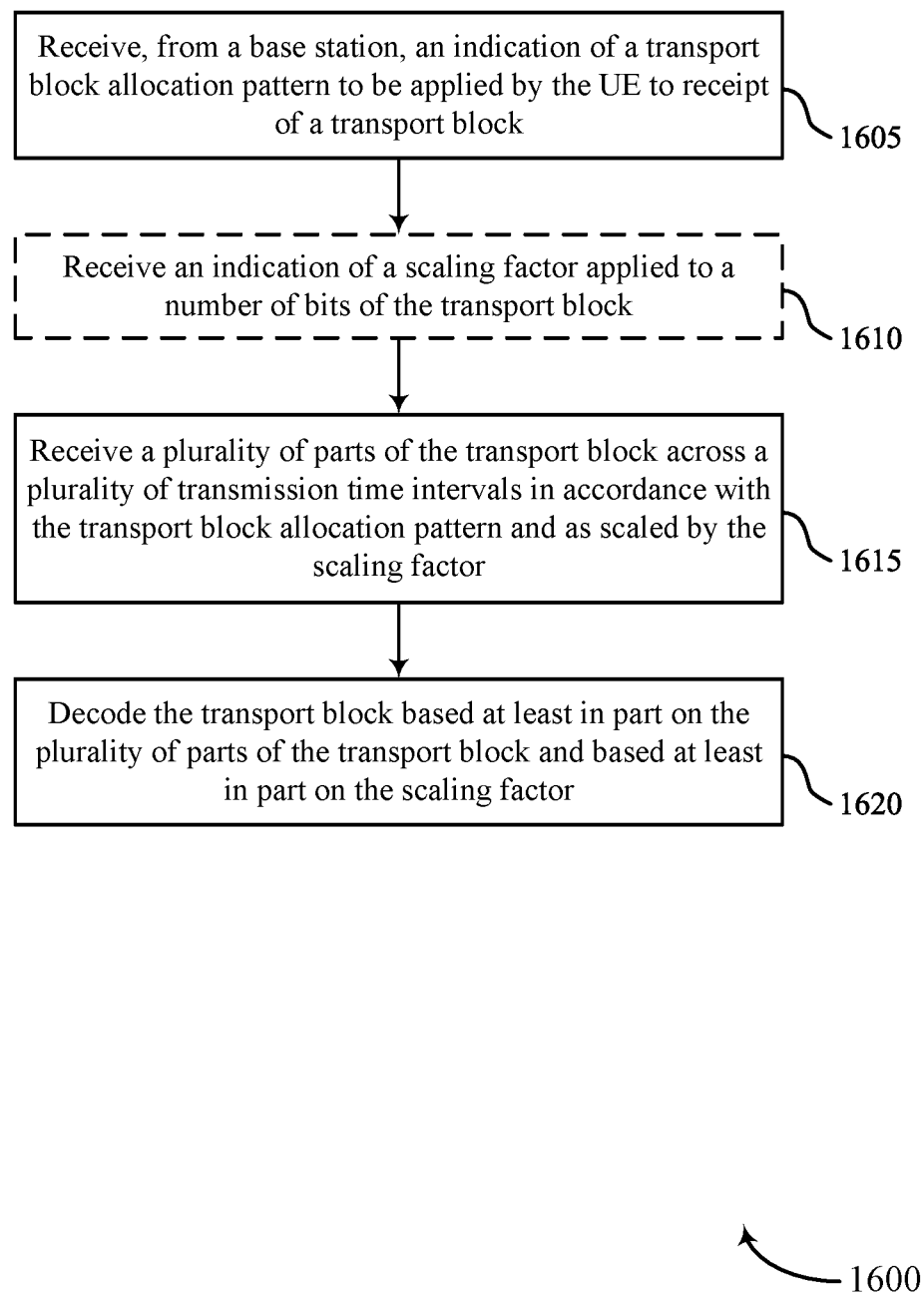

FIG. 16 shows a flowchart illustrating a method 1600 that supports techniques for interleaving a transport block in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, an indication of a transport block allocation pattern to be applied by the UE to receipt of a transport block. The operations of 1605 may be performed in accordance with examples as disclosed herein. In some examples, aspects of the operations of 1605 may be performed by an allocation pattern indication manager 825 as described with reference to FIG. 8.

In some examples, at 1610, the method may include receiving an indication of a scaling factor applied to a number of bits of the transport block. The operations of 1610 may be performed in accordance with examples as disclosed herein. In some examples, aspects of the operations of 1610 may be performed by a transport block parameter manager 840 as described with reference to FIG. 8.

At 1615, the method may include receiving a set of multiple parts of the transport block across a set of multiple TTIs in accordance with the transport block allocation pattern and as scaled by the scaling factor. The operations of 1615 may be performed in accordance with examples as disclosed herein. In some examples, aspects of the operations of 1615 may be performed by a transport block reception manager 830 as described with reference to FIG. 8.

At 1620, the method may include decoding the transport block based on the set of multiple parts of the transport block and based on the scaling factor. The operations of 1620 may be performed in accordance with examples as disclosed herein. In some examples, aspects of the operations of 1620 may be performed by a transport block decoding manager 835 as described with reference to FIG. 8.

Figure 17:
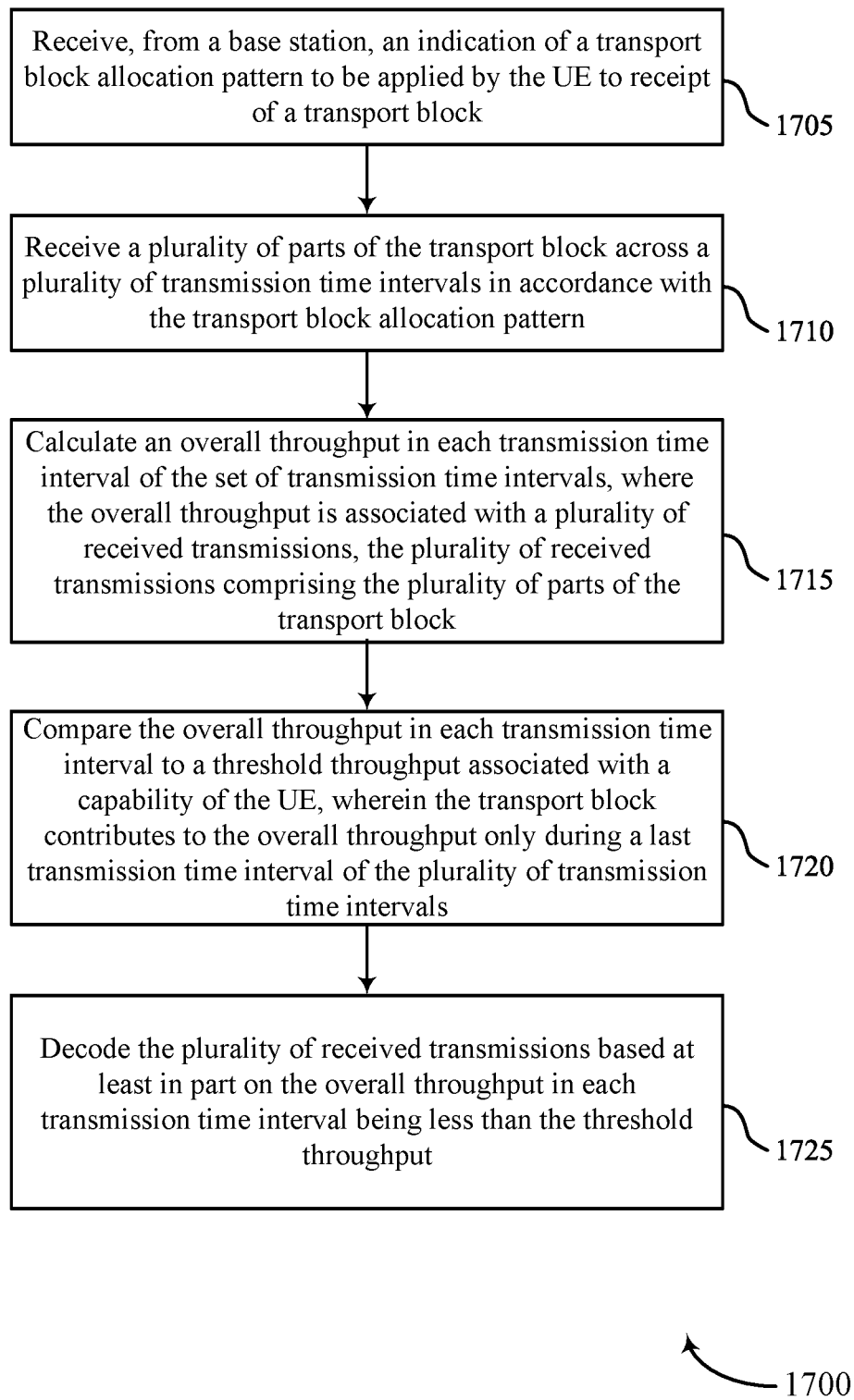

FIG. 17 shows a flowchart illustrating a method 1700 that supports techniques for interleaving a transport block in accordance with aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, an indication of a transport block allocation pattern to be applied by the UE to receipt of a transport block. The operations of 1705 may be performed in accordance with examples as disclosed herein. In some examples, aspects of the operations of 1705 may be performed by an allocation pattern indication manager 825 as described with reference to FIG. 8.

At 1710, the method may include receiving a set of multiple parts of the transport block across a set of multiple TTIs in accordance with the transport block allocation pattern. The operations of 1710 may be performed in accordance with examples as disclosed herein. In some examples, aspects of the operations of 1710 may be performed by a transport block reception manager 830 as described with reference to FIG. 8.

At 1715, the method may include calculating an overall throughput in each TTI of the set of TTs, where the overall throughput is associated with a set of multiple received transmissions, the set of multiple received transmissions including the set of multiple parts of the transport block. The operations of 1715 may be performed in accordance with examples as disclosed herein. In some examples, aspects of the operations of 1715 may be performed by a throughput manager 845 as described with reference to FIG. 8.

At 1720, the method may include comparing the overall throughput in each TTI to a threshold throughput associated with a capability of the UE, where the transport block contributes to the overall throughput only during a last TTI of the set of multiple TTIs. The operations of 1720 may be performed in accordance with examples as disclosed herein. In some examples, aspects of the operations of 1720 may be performed by a throughput manager 845 as described with reference to FIG. 8.

At 1725, the method may include decoding the set of multiple received transmissions based on the overall throughput in each TTI being less than the threshold throughput. The operations of 1725 may be performed in accordance with examples as disclosed herein. In some examples, aspects of the operations of 1725 may be performed by a transport block decoding manager 835 as described with reference to FIG. 8.

Figure 18:
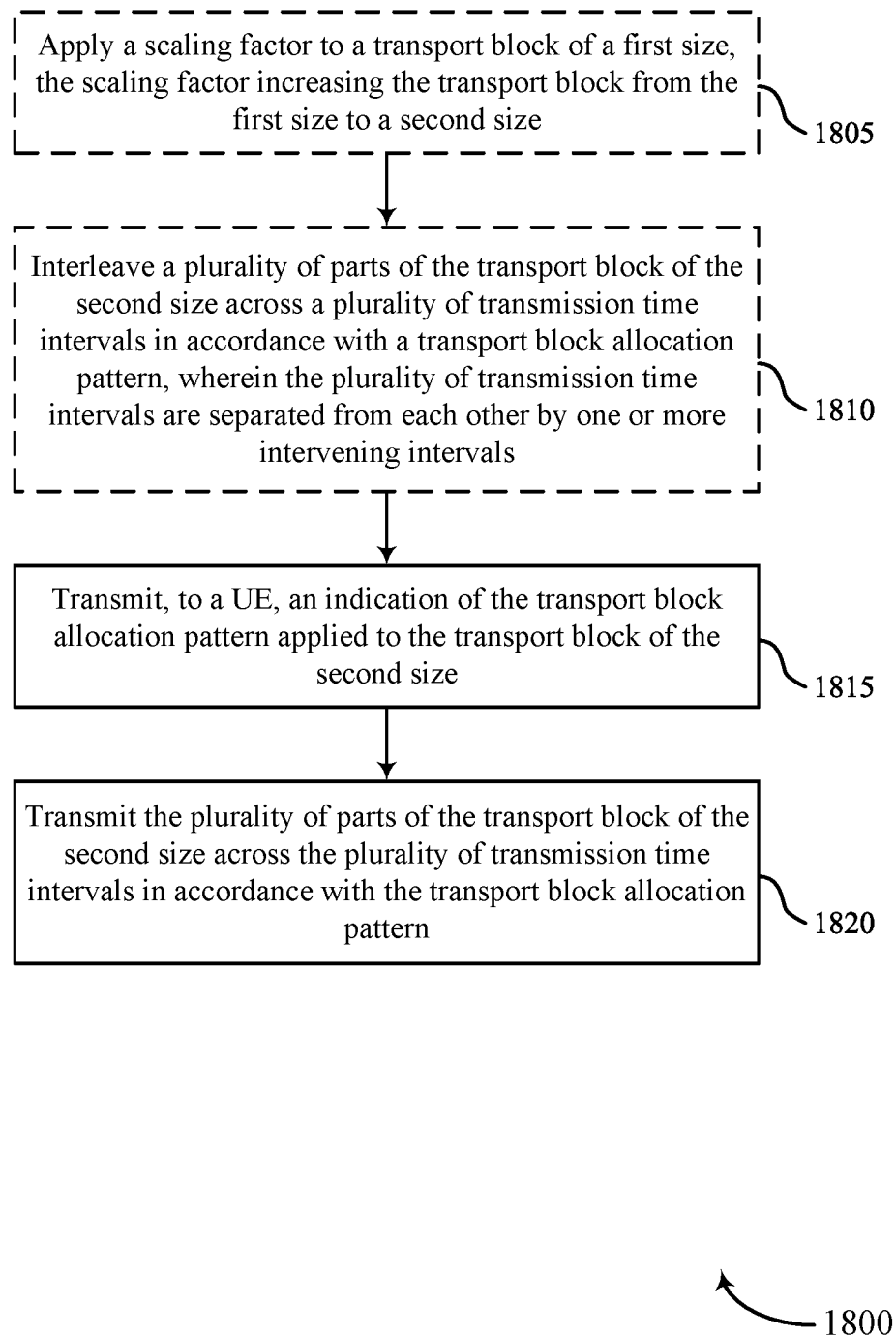

FIG. 18 shows a flowchart illustrating a method 1800 that supports techniques for interleaving a transport block in accordance with aspects of the present disclosure. The operations of the method 1800 may be implemented by a base station or its components as described herein. For example, the operations of the method 1800 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

In some examples, at 1805, the method may include applying a scaling factor to a transport block of a first size, the scaling factor increasing the transport block from the first size to a second size. The operations of 1805 may be performed in accordance with examples as disclosed herein. In some examples, aspects of the operations of 1805 may be performed by a scaling component 1225 as described with reference to FIG. 12.

In some examples, at 1810, the method may include interleaving a set of multiple parts of the transport block of the second size across a set of multiple TTIs in accordance with a transport block allocation pattern, where the set of multiple TTIs are separated from each other by one or more intervening intervals. The operations of 1810 may be performed in accordance with examples as disclosed herein. In some examples, aspects of the operations of 1810 may be performed by an interleaving component 1230 as described with reference to FIG. 12.

At 1815, the method may include transmitting, to a UE, an indication of the transport block allocation pattern applied to the transport block of the second size. The operations of 1815 may be performed in accordance with examples as disclosed herein. In some examples, aspects of the operations of 1815 may be performed by an allocation pattern indication component 1235 as described with reference to FIG. 12.

At 1820, the method may include transmitting the set of multiple parts of the transport block of the second size across the set of multiple TTIs in accordance with the transport block allocation pattern. The operations of 1820 may be performed in accordance with examples as disclosed herein. In some examples, aspects of the operations of 1820 may be performed by a transport block transmission component 1240 as described with reference to FIG. 12.

Figure 19:
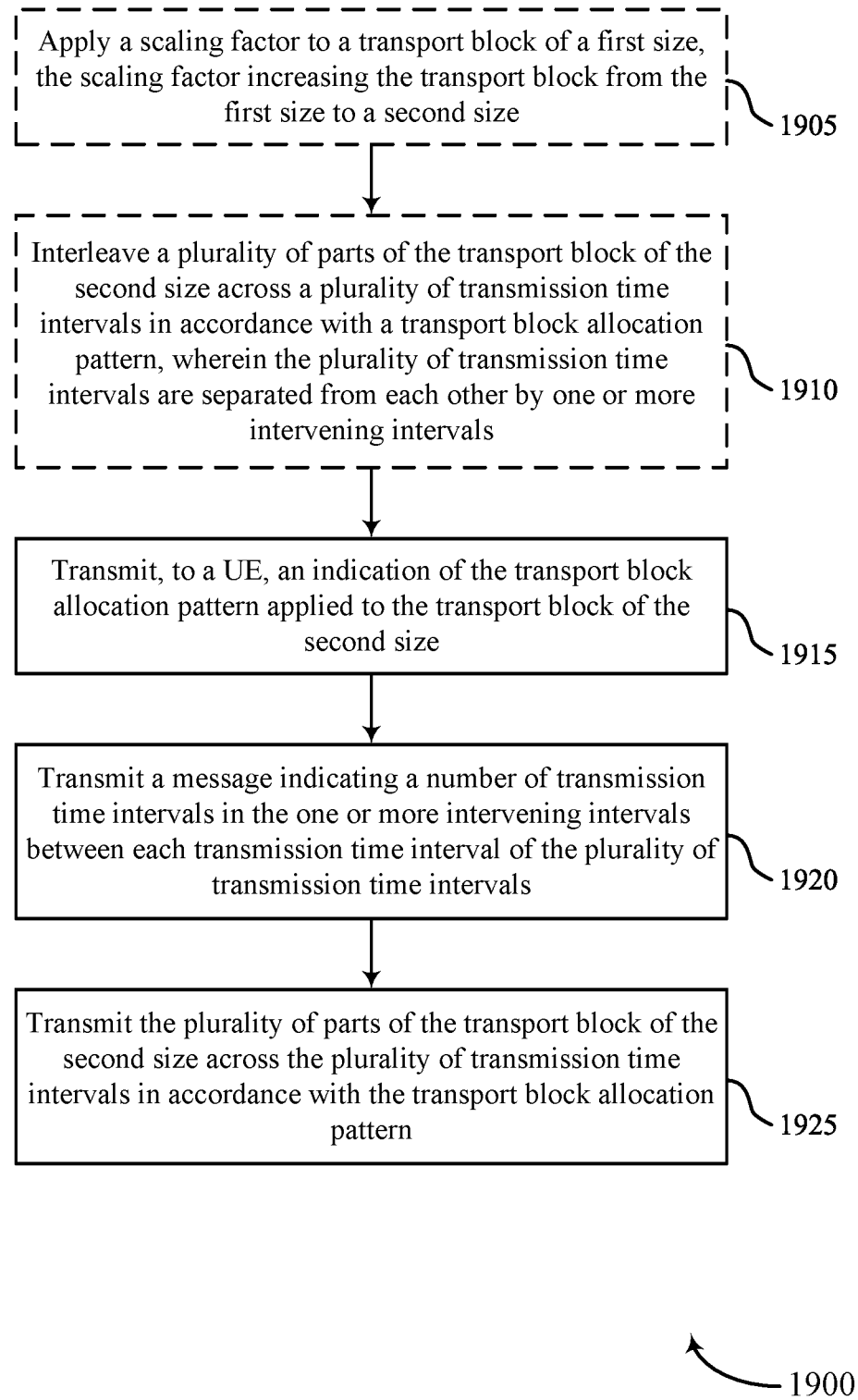

FIG. 19 shows a flowchart illustrating a method 1900 that supports techniques for interleaving a transport block in accordance with aspects of the present disclosure. The operations of the method 1900 may be implemented by a base station or its components as described herein. For example, the operations of the method 1900 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

In some examples, at 1905, the method may include applying a scaling factor to a transport block of a first size, the scaling factor increasing the transport block from the first size to a second size. The operations of 1905 may be performed in accordance with examples as disclosed herein. In some examples, aspects of the operations of 1905 may be performed by a scaling component 1225 as described with reference to FIG. 12.

In some examples, at 1910, the method may include interleaving a set of multiple parts of the transport block of the second size across a set of multiple TTIs in accordance with a transport block allocation pattern, where the set of multiple TTIs are separated from each other by one or more intervening intervals. The operations of 1910 may be performed in accordance with examples as disclosed herein. In some examples, aspects of the operations of 1910 may be performed by an interleaving component 1230 as described with reference to FIG. 12.

At 1915, the method may include transmitting, to a UE, an indication of the transport block allocation pattern applied to the transport block of the second size. The operations of 1915 may be performed in accordance with examples as disclosed herein. In some examples, aspects of the operations of 1915 may be performed by an allocation pattern indication component 1235 as described with reference to FIG. 12.

At 1920, the method may include transmitting a message indicating a number of TTIs in the one or more intervening intervals between each TTI of the set of multiple TTIs. The operations of 1920 may be performed in accordance with examples as disclosed herein. In some examples, aspects of the operations of 1920 may be performed by a TTI indication component 1250 as described with reference to FIG. 12.

At 1925, the method may include transmitting the set of multiple parts of the transport block of the second size across the set of multiple TTIs in accordance with the transport block allocation pattern. The operations of 1925 may be performed in accordance with examples as disclosed herein. In some examples, aspects of the operations of 1925 may be performed by a transport block transmission component 1240 as described with reference to FIG. 12.

Figure 20:
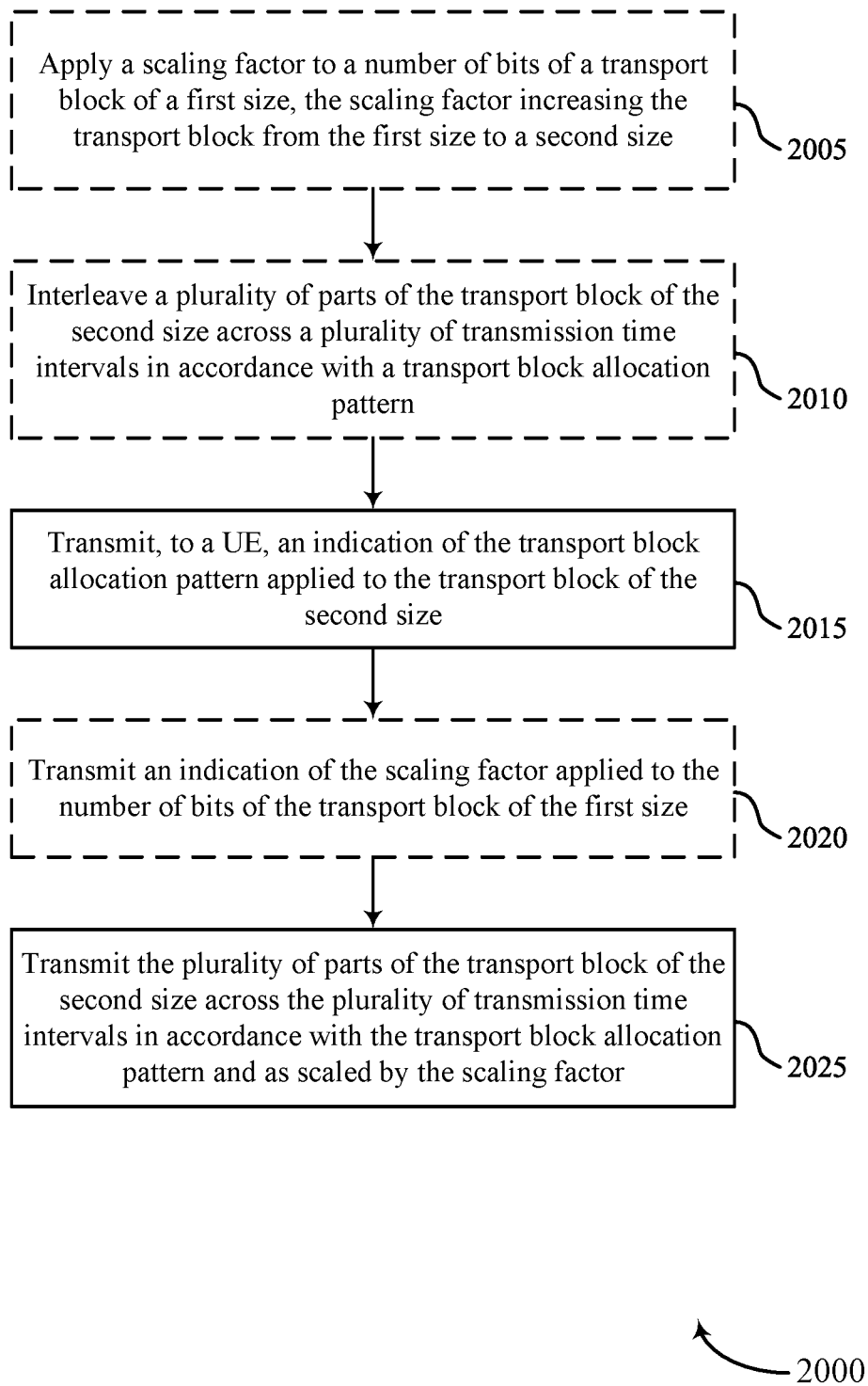

FIG. 20 shows a flowchart illustrating a method 2000 that supports techniques for interleaving a transport block in accordance with aspects of the present disclosure. The operations of the method 2000 may be implemented by a base station or its components as described herein. For example, the operations of the method 2000 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

In some examples, at 2005, the method may include applying a scaling factor to a number of bits of a transport block of a first size, the scaling factor increasing the transport block from the first size to a second size. The operations of 2005 may be performed in accordance with examples as disclosed herein. In some examples, aspects of the operations of 2005 may be performed by a scaling component 1225 as described with reference to FIG. 12.

In some examples, at 2010, the method may include interleaving a set of multiple parts of the transport block of the second size across a set of multiple TTIs in accordance with a transport block allocation pattern. The operations of 2010 may be performed in accordance with examples as disclosed herein. In some examples, aspects of the operations of 2010 may be performed by an interleaving component 1230 as described with reference to FIG. 12.

At 2015, the method may include transmitting, to a UE, an indication of the transport block allocation pattern applied to the transport block of the second size. The operations of 2015 may be performed in accordance with examples as disclosed herein. In some examples, aspects of the operations of 2015 may be performed by an allocation pattern indication component 1235 as described with reference to FIG. 12.

In some examples, at 2020, the method may include transmitting an indication of the scaling factor applied to the number of bits of the transport block of the first size. The operations of 2020 may be performed in accordance with examples as disclosed herein. In some examples, aspects of the operations of 2020 may be performed by a transport block parameter component 1245 as described with reference to FIG. 12.

At 2025, the method may include transmitting the set of multiple parts of the transport block of the second size across the set of multiple TTIs in accordance with the transport block allocation pattern and as scaled by the scaling factor. The operations of 2025 may be performed in accordance with examples as disclosed herein. In some examples, aspects of the operations of 2025 may be performed by a transport block transmission component 1240 as described with reference to FIG. 12.

The following provides an overview of aspects of the present disclosure:

Aspect 1: A method for wireless communications at a UE, comprising: receiving, from a base station, an indication of a transport block allocation pattern to be applied by the UE to receipt of a transport block; receiving a plurality of parts of the transport block across a plurality of transmission time intervals in accordance with the transport block allocation pattern, wherein the plurality of transmission time intervals are separated from each other by one or more intervening intervals; and decoding the transport block based at least in part on the plurality of parts of the transport block.

Aspect 2: The method of aspect 1, wherein receiving the indication of the transport block allocation pattern further comprises: receiving a message indicating a number of transmission time intervals in the one or more intervening intervals between each transmission time interval of the plurality of transmission time intervals.

Aspect 3: The method of aspect 2, further comprising: receiving a first set of parts of the plurality of parts in a first transmission time interval; and receiving a second set of parts of the plurality of parts in a second transmission time interval, the first transmission time interval and the second transmission time interval separated by the number of transmission time intervals in accordance with the transport block allocation pattern.

Aspect 4: The method of any of aspects 1 through 3, wherein receiving the indication of the transport block allocation pattern further comprises: receiving a message indicating one or more time domain resource allocation table entries; and receiving an indication of a time domain resource allocation table entry of the one or more time domain resource allocation table entries, the transport block allocation pattern indicated by the time domain resource allocation table entry.

Aspect 5: The method of any of aspects 1 through 4, further comprising: receiving a message indicating the UE is scheduled to receive a second transport block, wherein the transport block is time-interleaved with the second transport block, the transport block allocation pattern to be applied by the UE to receipt of the transport block and the second transport block.

Aspect 6: The method of any of aspects 1 through 5, further comprising: receiving an indication of one or more parameters associated with the transport block, wherein decoding the transport block is based at least in part on the one or more parameters.

Aspect 7: The method of aspect 6, wherein the one or more parameters indicate that each part of the plurality of parts is mapped to one redundancy version of a plurality of redundancy versions.

Aspect 8: The method of aspect 7, wherein receiving the indication of the one or more parameters further comprises: receiving a mapping of each redundancy version of the plurality of redundancy versions to a circular buffer.

Aspect 9: The method of aspect 8, wherein the mapping indicates a starting position of a first redundancy version of the plurality of redundancy versions and a starting position of each subsequent of each redundancy version based on an ending of a previous adjacent redundancy version.

Aspect 10: The method of any of aspects 8 through 9, wherein the mapping indicates a defined starting position of each redundancy version of the plurality of redundancy versions, the plurality of redundancy versions comprising five or more redundancy versions.

Aspect 11: A method for wireless communications at a UE, comprising: receiving, from a base station, an indication of a transport block allocation pattern to be applied by the UE to receipt of a transport block; receiving an indication of a scaling factor applied to a number of bits of the transport block; receiving a plurality of parts of the transport block across a plurality of transmission time intervals in accordance with the transport block allocation pattern and as scaled by the scaling factor; and decoding the transport block based at least in part on the plurality of parts of the transport block and based at least in part on the scaling factor.

Aspect 12: The method of aspect 11, further comprising: receiving a predefined threshold scaling factor corresponding to the number of bits of the transport block for performing limited buffer rate matching.

Aspect 13: The method of aspect 12, further comprising: determining a threshold transport block size for performing limited buffer rate matching, wherein the threshold transport block size is based at least in part on a maximum supported modulation order of the UE, a predefined threshold modulation order independent of a configured modulation order for downlink reception, the predefined maximum scaling factor corresponding to the number of bits of the transport block, a predefined threshold code rate, or a combination thereof.

Aspect 14: The method of any of aspects 11 through 13, further comprising: identifying a coding rate associated with decoding the transport block in a transmission time interval of the plurality of transmission time intervals; and comparing the coding rate to a predefined maximum coding rate, wherein decoding the transport block in the transmission time interval is based at least in part on the coding rate being less than the predefined maximum coding rate.

Aspect 15: The method of aspect 14, further comprising: decoding the transport block in only a last transmission time interval of the plurality of transmission time intervals based at least in part on the coding rate being greater than the predefined maximum coding rate.

Aspect 16: The method of any of aspects 14 through 15, wherein the predefined maximum coding rate is greater than 0.95.

Aspect 17: The method of any of aspects 11 through 16, further comprising: receiving an indication that the scaling factor is equal to a number of transmission time intervals across which the plurality of parts of the transport block are received.

Aspect 18: The method of any of aspects 11 through 17, further comprising: receiving a message indicating one or more parameters associated with the transport block, wherein the one or more parameters are associated with the transport block being scaled, the scaling factor being a parameter of the one or more parameters.

Aspect 19: The method of aspect 18, wherein the one or more parameters indicate that each part of the plurality of parts is mapped to one redundancy version of a plurality of redundancy versions.

Aspect 20: The method of aspect 19, wherein receiving the indication of the one or more parameters further comprises: receiving a mapping of each redundancy version of the plurality of redundancy versions to a circular buffer.

Aspect 21: The method of aspect 20, wherein the mapping indicates a starting position of a first redundancy version of the plurality of redundancy versions and a starting position of each subsequent of each redundancy version based on an ending of a previous adjacent redundancy version.

Aspect 22: The method of any of aspects 20 through 21, wherein the mapping indicates a defined starting position of each redundancy version of the plurality of redundancy versions, the plurality of redundancy versions comprising five or more redundancy versions.

Aspect 23: The method of any of aspects 11 through 22, wherein the plurality of transmission time intervals are separated from each other by one or more intervening intervals.

Aspect 24: The method of aspect 23, wherein the transport block corresponds to a multicast or broadcast transmission.

Aspect 25: The method of aspect 24, wherein the transport block allocation pattern indicates that the multicast or broadcast transmission is interleaved with a unicast transmission.

Aspect 26: The method of any of aspects 23 through 25, further comprising: receiving a downlink control information message indicating scheduling information for a plurality of transport blocks, wherein the plurality of transport blocks are interleaved.

Aspect 27: The method of any of aspects 11 through 26, wherein the plurality of transmission time intervals comprise a contiguous time allocation.

Aspect 28: The method of any of aspects 11 through 27, wherein receiving the indication of the transport block allocation pattern further comprises: receiving a downlink control information message comprising the indication.

Aspect 29: The method of any of aspects 11 through 28, wherein each transmission time interval of the plurality of transmission time intervals is a slot.

Aspect 30: A method for wireless communications at a UE, comprising: receiving, from a base station, an indication of a transport block allocation pattern to be applied by the UE to receipt of a transport block; receiving a plurality of parts of the transport block across a plurality of transmission time intervals in accordance with the transport block allocation pattern; calculating an overall throughput in each transmission time interval of the plurality of transmission time intervals, wherein the overall throughput is associated with a plurality of received transmissions, the plurality of received transmissions comprising the plurality of parts of the transport block; comparing the overall throughput in each transmission time interval to a threshold throughput associated with a capability of the UE, wherein the transport block contributes to the overall throughput only during a last transmission time interval of the plurality of transmission time intervals; and decoding the plurality of received transmissions based at least in part on the overall throughput in each transmission time interval being less than the threshold throughput.

Aspect 31: A method for wireless communications at a base station, comprising: applying a scaling factor to a transport block of a first size, the scaling factor increasing the transport block from the first size to a second size; interleaving a plurality of parts of the transport block of the second size across a plurality of transmission time intervals in accordance with a transport block allocation pattern, wherein the plurality of transmission time intervals are separated from each other by one or more intervening intervals; transmitting, to a UE, an indication of the transport block allocation pattern applied to the transport block of the second size; and transmitting the plurality of parts of the transport block of the second size across the plurality of transmission time intervals in accordance with the transport block allocation pattern.

Aspect 32: The method of aspect 31, wherein transmitting the indication of the transport block allocation pattern further comprises: transmitting a message indicating a number of transmission time intervals in the one or more intervening intervals between each transmission time interval of the plurality of transmission time intervals.

Aspect 33: The method of aspect 32, further comprising: transmitting a first set of parts of the plurality of parts in a first transmission time interval; and transmitting a second set of parts of the plurality of parts in a second transmission time interval, the first transmission time interval and the second transmission time interval separated by the number of transmission time intervals in accordance with the transport block allocation pattern.

Aspect 34: The method of any of aspects 31 through 33, wherein transmitting the indication of the transport block allocation pattern further comprises: transmitting a message indicating one or more time domain resource allocation table entries; and transmitting an indication of a time domain resource allocation table entry of the one or more time domain resource allocation table entries, the transport block allocation pattern indicated by the time domain resource allocation table entry.

Aspect 35: The method of any of aspects 31 through 34, further comprising: transmitting a message indicating the UE is scheduled to receive a second transport block, wherein the transport block of the second size is time-interleaved with the second transport block in accordance with the transport block allocation pattern.

Aspect 36: The method of any of aspects 31 through 35, further comprising: transmitting an indication of one or more parameters associated with the transport block.

Aspect 37: The method of aspect 36, wherein the one or more parameters indicate that each part of the plurality of parts is mapped to one redundancy version of a plurality of redundancy versions.

Aspect 38: The method of aspect 37, wherein transmitting the indication of the one or more parameters further comprises: transmitting a mapping of each redundancy version of the plurality of redundancy versions to a circular buffer.

Aspect 39: The method of aspect 38, wherein the mapping indicates a starting position of a first redundancy version of the plurality of redundancy versions and a starting position of each subsequent of each redundancy version based on an ending of a previous adjacent redundancy version.

Aspect 40: The method of any of aspects 38 through 39, wherein the mapping indicates a defined starting position of each redundancy version of the plurality of redundancy versions, the plurality of redundancy versions comprising five or more redundancy versions.

Aspect 41: A method for wireless communications at a base station, comprising: applying a scaling factor to a number of bits of a transport block of a first size, the scaling factor increasing the transport block from the first size to a second size; interleaving a plurality of parts of the transport block of the second size across a plurality of transmission time intervals in accordance with a transport block allocation pattern; transmitting, to a UE, an indication of the transport block allocation pattern applied to the transport block of the second size; and transmitting an indication of the scaling factor applied to the number of bits of the transport block of the first size; and transmitting the plurality of parts of the transport block of the second size across the plurality of transmission time intervals in accordance with the transport block allocation pattern and as scaled by the scaling factor.

Aspect 42: The method of aspect 41, further comprising: transmitting a predefined maximum scaling factor for performing limited buffer rate matching, wherein the scaling factor is less than or equal to the predefined maximum scaling factor, and wherein the predefined maximum scaling factor corresponds to the number of bits of the transport block.

Aspect 43: The method of aspect 42, further comprising: transmitting a predefined maximum transport block size for performing limited buffer rate matching, wherein the predefined maximum transport block size is based at least in part on a maximum modulation order of the UE, the predefined maximum scaling factor corresponding to the number of bits of the transport block, a predefined maximum code rate, or a combination thereof.

Aspect 44: The method of any of aspects 41 through 43, further comprising: transmitting an indication that the scaling factor is equal to a number of transmission time intervals across which the plurality of parts of the transport block are transmitted.

Aspect 45: The method of any of aspects 41 through 44, further comprising: transmitting a message indicating one or more parameters associated with the transport block, wherein the one or more parameters are associated with the transport block being scaled, the scaling factor being a parameter of the one or more parameters.

Aspect 46: The method of aspect 45, wherein the one or more parameters indicate that each part of the plurality of parts is mapped to one redundancy version of a plurality of redundancy versions.

Aspect 47: The method of aspect 46, wherein transmitting the indication of the one or more parameters further comprises: transmitting a mapping of each redundancy version of the plurality of redundancy versions to a circular buffer.

Aspect 48: The method of aspect 47, wherein the mapping indicates a starting position of a first redundancy version of the plurality of redundancy versions and a starting position of each subsequent of each redundancy version based on an ending of a previous adjacent redundancy version.

Aspect 49: The method of any of aspects 47 through 48, wherein the mapping indicates a defined starting position of each redundancy version of the plurality of redundancy versions, the plurality of redundancy versions comprising five or more redundancy versions.

Aspect 50: The method of any of aspects 41 through 49, wherein the plurality of transmission time intervals are separated from each other by one or more intervening intervals.

Aspect 51: The method of aspect 50, wherein the transport block allocation pattern indicates that the transport block is a multicast or broadcast transmission.

Aspect 52: The method of aspect 51, wherein the transport block allocation pattern indicates that the multicast or broadcast transmission is interleaved with a unicast transmission.

Aspect 53: The method of any of aspects 50 through 52, further comprising: transmitting a downlink control information message indicating scheduling information for a plurality of transport blocks, wherein the plurality of transport blocks are interleaved.

Aspect 54: The method of any of aspects 41 through 53, wherein transmitting the indication of the transport block allocation pattern further comprises: transmitting a downlink control information message comprising the indication.

Aspect 55: The method of any of aspects 41 through 54, wherein each transmission time interval of the plurality of transmission time intervals is a slot.

Aspect 56: An apparatus for wireless communications at a UE, comprising a processor; memory coupled with the processor; and instructions stored in the memory and executable by the processor to cause the apparatus to perform a method of any of aspects 1 through 10.

Aspect 57: An apparatus for wireless communications at a UE, comprising at least one means for performing a method of any of aspects 1 through 10.

Aspect 58: A non-transitory computer-readable medium storing code for wireless communications at a UE, the code comprising instructions executable by a processor to perform a method of any of aspects 1 through 10.

Aspect 59: An apparatus for wireless communications at a UE, comprising a processor; memory coupled with the processor; and instructions stored in the memory and executable by the processor to cause the apparatus to perform a method of any of aspects 11 through 29.

Aspect 60: An apparatus for wireless communications at a UE, comprising at least one means for performing a method of any of aspects 11 through 29.

Aspect 61: A non-transitory computer-readable medium storing code for wireless communications at a UE, the code comprising instructions executable by a processor to perform a method of any of aspects 11 through 29.

Aspect 62: An apparatus for wireless communications at a UE, comprising a processor; memory coupled with the processor; and instructions stored in the memory and executable by the processor to cause the apparatus to perform a method of any of aspects 30 through 30.

Aspect 63: An apparatus for wireless communications at a UE, comprising at least one means for performing a method of any of aspects 30 through 30.

Aspect 64: A non-transitory computer-readable medium storing code for wireless communications at a UE, the code comprising instructions executable by a processor to perform a method of any of aspects 30 through 30.

Aspect 65: An apparatus for wireless communications at a base station, comprising a processor; memory coupled with the processor; and instructions stored in the memory and executable by the processor to cause the apparatus to perform a method of any of aspects 31 through 40.

Aspect 66: An apparatus for wireless communications at a base station, comprising at least one means for performing a method of any of aspects 31 through 40.

Aspect 67: A non-transitory computer-readable medium storing code for wireless communications at a base station, the code comprising instructions executable by a processor to perform a method of any of aspects 31 through 40.

Aspect 68: An apparatus for wireless communications at a base station, comprising a processor; memory coupled with the processor; and instructions stored in the memory and executable by the processor to cause the apparatus to perform a method of any of aspects 41 through 55.

Aspect 69: An apparatus for wireless communications at a base station, comprising at least one means for performing a method of any of aspects 41 through 55.

Aspect 70: A non-transitory computer-readable medium storing code for wireless communications at a base station, the code comprising instructions executable by a processor to perform a method of any of aspects 41 through 55.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure.

Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
receiving an indication of a transport block allocation pattern to be applied by the UE to receipt of a transport block, the transport block allocation pattern indicating a quantity of transmission time intervals included in an interval between reception of a first redundancy version of the transport block and reception of a second redundancy version of the transport block, wherein the first redundancy version and the second redundancy version are part of a plurality of redundancy versions of the transport block;
receiving the plurality of redundancy versions of the transport block across a plurality of transmission time intervals in accordance with the transport block allocation pattern, wherein the plurality of transmission time intervals are each separated from each other by the quantity of transmission time intervals in one or more intervening intervals;
aggregating the plurality of redundancy versions of the transport block based at least in part on a mapping between respective indices of the plurality of redundancy versions of the transport block and a plurality of starting points within a circular buffer, wherein the mapping is determined based at least in part on the transport block allocation pattern; and
decoding the transport block based at least in part on aggregating the plurality of redundancy versions.

2. The method of claim 1, further comprising:
receiving a first set of redundancy versions of the plurality of redundancy versions in a first transmission time interval; and
receiving a second set of redundancy versions of the plurality of redundancy versions in a second transmission time interval, the first transmission time interval and the second transmission time interval separated by the quantity of transmission time intervals in accordance with the transport block allocation pattern.

3. The method of claim 1, wherein receiving the indication of the transport block allocation pattern further comprises:
receiving a message indicating one or more time domain resource allocation table entries; and
receiving an indication of a time domain resource allocation table entry of the one or more time domain resource allocation table entries, the transport block allocation pattern indicated by the time domain resource allocation table entry.

4. The method of claim 1, further comprising:
receiving a message indicating the UE is scheduled to receive a second transport block, wherein the transport block is time-interleaved with the second transport block, the transport block allocation pattern to be applied by the UE to receipt of the transport block and the second transport block.

5. The method of claim 1, further comprising:
receiving an indication of one or more parameters associated with the transport block, wherein decoding the transport block is based at least in part on the one or more parameters.

6. The method of claim 5, wherein receiving the indication of the one or more parameters further comprises:
receiving an indication of the mapping of each redundancy version of the plurality of redundancy versions to the circular buffer.

7. The method of claim 1, wherein the mapping indicates a starting position of the first redundancy version of the plurality of redundancy versions and a starting position of each subsequent of each redundancy version based on an ending of a previous adjacent redundancy version.

8. The method of claim 1, wherein the mapping indicates a defined starting position of each redundancy version of the plurality of redundancy versions, the plurality of redundancy versions comprising five or more redundancy versions.

9. A method for wireless communications at a user equipment (UE), comprising:
receiving an indication of a transport block allocation pattern to be applied by the UE to receipt of a transport block, the transport block allocation pattern indicating a quantity of transmission time intervals included in an interval between reception of a first redundancy version of the transport block and reception of a second redundancy version of the transport block, wherein the first redundancy version and the second redundancy version are part of a plurality of redundancy versions of the transport block;
receiving an indication of a scaling factor applied to a quantity of bits of the transport block;
receiving the plurality of redundancy versions of the transport block across a plurality of transmission time intervals in accordance with the transport block allocation pattern and as scaled by the scaling factor, wherein the plurality of transmission time intervals are each separated from each other by the quantity of transmission time intervals in one or more intervening intervals;
aggregating the plurality of redundancy versions of the transport block based at least in part on the scaling factor and a mapping between respective indices of the plurality of redundancy versions of the transport block and a plurality of starting points within a circular buffer, wherein the mapping is determined based at least in part on the transport block allocation pattern; and
decoding the transport block based at least in part on aggregating the plurality of redundancy versions.

10. The method of claim 9, further comprising:
receiving a predefined threshold scaling factor corresponding to the quantity of bits of the transport block for performing limited buffer rate matching.

11. The method of claim 10, further comprising:
determining a threshold transport block size for performing limited buffer rate matching, wherein the threshold transport block size is based at least in part on a maximum supported modulation order of the UE, a predefined threshold modulation order independent of a configured modulation order for downlink reception, the predefined threshold scaling factor corresponding to the quantity of bits of the transport block, a predefined threshold code rate, or a combination thereof.

12. The method of claim 9, further comprising:
identifying a coding rate associated with decoding the transport block in a transmission time interval of the plurality of transmission time intervals; and
comparing the coding rate to a predefined maximum coding rate, wherein decoding the transport block in the transmission time interval is based at least in part on the coding rate being less than the predefined maximum coding rate.

13. The method of claim 12, further comprising:
decoding the transport block in only a last transmission time interval of the plurality of transmission time intervals based at least in part on the coding rate being greater than the predefined maximum coding rate.

14. The method of claim 9, further comprising:
receiving an indication that the scaling factor is equal to a quantity of transmission time intervals across which the plurality of redundancy versions of the transport block are received.

15. The method of claim 9, further comprising:
receiving a message indicating one or more parameters associated with the transport block, wherein the one or more parameters are associated with the transport block being scaled, the scaling factor being a parameter of the one or more parameters.

16. The method of claim 15, wherein receiving the indication of the one or more parameters further comprises:
receiving a mapping of each redundancy version of the plurality of redundancy versions to the circular buffer.

17. The method of claim 9, wherein the mapping indicates a starting position of the first redundancy version of the plurality of redundancy versions and a starting position of each subsequent of each redundancy version based on an ending of a previous adjacent redundancy version.

18. The method of claim 9, wherein the mapping indicates a defined starting position of each redundancy version of the plurality of redundancy versions, the plurality of redundancy versions comprising five or more redundancy versions.

19. The method of claim 9, wherein the plurality of transmission time intervals are separated from each other by one or more intervening intervals.

20. The method of claim 19, wherein the transport block corresponds to a multicast or broadcast transmission.

21. The method of claim 19, further comprising:
receiving a downlink control information message indicating scheduling information for a plurality of transport blocks, wherein the plurality of transport blocks are interleaved.

22. The method of claim 9, wherein the plurality of transmission time intervals comprise a contiguous time allocation.

23. The method of claim 9, wherein receiving the indication of the transport block allocation pattern further comprises:
receiving a downlink control information message comprising the indication.

24. A method for wireless communications at a user equipment (UE), comprising:
receiving an indication of a transport block allocation pattern to be applied by the UE to receipt of a transport block;
receiving a plurality of redundancy versions of the transport block across a plurality of transmission time intervals in accordance with the transport block allocation pattern;
calculating an overall throughput in each transmission time interval of the plurality of transmission time intervals, wherein the overall throughput is associated with a plurality of received transmissions, the plurality of received transmissions comprising the plurality of redundancy versions of the transport block;
comparing the overall throughput in each transmission time interval to a threshold throughput associated with a capability of the UE, wherein the transport block contributes to the overall throughput only during a last transmission time interval of the plurality of transmission time intervals; and
decoding the plurality of received transmissions based at least in part on the overall throughput in each transmission time interval being less than the threshold throughput.

25. A method for wireless communications at a network entity, comprising:
applying a scaling factor to a transport block of a first size, the scaling factor increasing the transport block from the first size to a second size;
interleaving a plurality of redundancy versions of the transport block of the second size across a plurality of transmission time intervals in accordance with a transport block allocation pattern, wherein each of the plurality of transmission time intervals are separated from each other by a quantity of transmission time intervals in one or more intervening intervals and wherein each redundancy version of the plurality of redundancy versions of the transport block comprises a respective part of the transport block;
transmitting an indication of the transport block allocation pattern applied to the transport block of the second size, wherein the transport block allocation pattern indicates a mapping between respective indices of the plurality of redundancy versions of the transport block and a plurality of starting points within a circular buffer and indicates the quantity of transmission time intervals in the one or more intervening intervals; and
transmitting the plurality of redundancy versions of the transport block of the second size across the plurality of transmission time intervals in accordance with the transport block allocation pattern.

26. The method of claim 25, further comprising:
transmitting a first set of redundancy versions of the plurality of redundancy versions in a first transmission time interval; and
transmitting a second set of redundancy versions of the plurality of redundancy versions in a second transmission time interval, the first transmission time interval and the second transmission time interval separated by the quantity of transmission time intervals in accordance with the transport block allocation pattern.

* * * * *